United States Patent
Westhuizen et al.

(10) Patent No.: US 11,980,184 B2
(45) Date of Patent: May 14, 2024

(54) METHOD OF MAKING A FLAVONOID SOLUTION AND APPLICATIONS THEREOF FOR PLANT GROWTH PROMOTION, SEED COATING, PATHOGEN ELIMINATION, AND HERBICIDE STUNTING EFFECT REMOVAL

(71) Applicants: Pieter Theron van der Westhuizen, Paarl (ZA); Dirk Cornelis Barnard, Clovis, CA (US); Kevin Khoa Anh Le, San Jose, CA (US); Chih-Cheng Tai, Campbell, CA (US)

(72) Inventors: Pieter Theron van der Westhuizen, Paarl (ZA); Dirk Cornelis Barnard, Clovis, CA (US); Kevin Khoa Anh Le, San Jose, CA (US); Chih-Cheng Tai, Campbell, CA (US)

(73) Assignee: THE BIO CONSULTING (PTY) LTD, Paarl (ZA)

(*) Notice: Subject to any disclaimer, the term of this patent is extended or adjusted under 35 U.S.C. 154(b) by 0 days.

(21) Appl. No.: 16/684,157

(22) Filed: Nov. 14, 2019

(65) Prior Publication Data
US 2020/0146287 A1 May 14, 2020

Related U.S. Application Data

(60) Provisional application No. 62/767,300, filed on Nov. 14, 2018.

(51) Int. Cl.
| | | |
|---|---|---|
| *C07D 471/04* | (2006.01) | |
| *A01C 1/06* | (2006.01) | |
| *A01N 25/02* | (2006.01) | |
| *A01N 31/16* | (2006.01) | |
| *A01N 37/02* | (2006.01) | |
| *A01N 43/16* | (2006.01) | |
| *A01N 43/90* | (2006.01) | |

(52) U.S. Cl.
CPC .............. *A01N 43/16* (2013.01); *A01C 1/06* (2013.01); *A01N 31/16* (2013.01); *A01N 37/02* (2013.01); *A01N 43/90* (2013.01); *A01N 25/02* (2013.01)

(58) Field of Classification Search
CPC ........ A01N 43/16; A01N 31/16; A01N 37/02; A01N 43/90; A01N 25/02; A01C 1/06
See application file for complete search history.

(56) References Cited

U.S. PATENT DOCUMENTS

2003/0180395 A1 * 9/2003 Bueter .................. A61K 36/67
424/725

FOREIGN PATENT DOCUMENTS

| WO | WO-2006105842 A1 * | 10/2006 | ............. A01N 37/02 |
| WO | WO-2014122446 A1 * | 8/2014 | ............. A01N 65/00 |

OTHER PUBLICATIONS

Kurepa J, Shull TE and Smalle JA. (Quercetin feeding protects plants against oxidative stress [version 1; peer review: 1 approved, 1 approved with reservations]. F1000Research 2016, 5:2430 (https://doi.org/10.12688/f1000research.9659.1)), hereinafter Kurepa (Year: 2016).*
Silva et al. Scientia Horticulturae 158 (2013) 39-44 (Year: 2013).*
Razzaq et al. Pak. J. Weed Sci. Res. 16 (3): 247-256, 2010 (Year: 2010).*
Rajyalakshmi et al. Journal of Agricultural Science vol. 3, No. 2; Jun. 2011, 123-137 (Year: 2011).*
Kim, J-B. J. Korean Soc. Appl. Biol. Chem. 48(1), 1-15, 2005 (Year: 2005).*
Kong et al. Plant and Soil 264: 149-157, 2004 (Year: 2004).*
Raskin, Ilya, and Christophe Ripoll. "Can an apple a day keep the doctor away ?. " Current pharmaceutical design 10.27 (2004): 3419-3429. (Year: 2004).*
Pekić, B., et al. "Study of the extraction of proanthocyanidins from grape seeds." Food Chemistry 61.1-2 (1998): 201-206. (Year: 1998).*
Santos et al. Scientia Horticulturae 107 (2006) 131-136. (Year: 2006).*

* cited by examiner

*Primary Examiner* — Erin E Hirt
*Assistant Examiner* — Janice Y Silverman
(74) *Attorney, Agent, or Firm* — Shannon Yen; Weiting Chen

(57) ABSTRACT

A flavonoid combination solution, and a manufacturing method and applications thereof for plant growth development are provided. The flavonoid combination solution are obtained by mixing a first solution with heating to >85° C. or without heating, a second solution without heating and a palm oil blend. The solution is effective in promoting plant growth, enhancing a seed germination rate, reducing pathogens, and reducing/eliminating stunting effects of a herbicide.

1 Claim, 19 Drawing Sheets

US 11,980,184 B2

METHOD OF MAKING A FLAVONOID SOLUTION AND APPLICATIONS THEREOF FOR PLANT GROWTH PROMOTION, SEED COATING, PATHOGEN ELIMINATION, AND HERBICIDE STUNTING EFFECT REMOVAL

CROSS-REFERENCE TO RELATED APPLICATIONS

This application claims priority to the U.S. Provisional Application No. 62/767,300, titled "METHODS OF MAKING A PLANT FOLIAR FLAVONOID MIXTURE," filed on Nov. 14, 2018, which is incorporated by reference in its entirety for all purposes.

FIELD OF INVENTION

The present invention relates to a flavonoid combination solution, and a manufacturing method and applications thereof for a plant growth development.

BACKGROUND OF THE INVENTION

Flavonoids play a variety of biological activities in plants, animals, and bacteria, wherein more than 6000 different flavonoids identified in plants. Flavonoids are the low molecular weight polyphenolic secondary metabolic compounds, universally distributed in green plant kingdom, and located in cell vacuoles. Depending upon the degree of oxidation and saturation in the heterocyclic ring, flavonoids can be further sub-divided into the following groups: flavan, flavanone, dihydroflavonol, flavonol, flavone, flavone-3-ol and flavone-3,4-diol.

The significance of flavonoids in plant physiology is unparalleled and more and more efforts may require for their biosynthetic aspects in order to explore better production, mechanism of actions and ensure safety.

SUMMARY OF THE INVENTION

The present disclosure provides a flavonoid combination solution, and a manufacturing method and applications thereof to enhance plant growth development.

In a first aspect, plant growth promoting solution comprises a first flavonoid mixture, a second flavonoid mixture, and a palm oil blend, wherein the first flavonoid mixture is heat treated at a temperature higher than 65 degree C. (° C.), wherein the second flavonoid mixture is non-heat treated, and wherein a ratio of the first flavonoid mixture and the second flavonoid mixture to the palm oil blend is 5:1 or 6:1.

In some embodiments, the first flavonoid mixture comprises a first plant extracts, one or more carrier solvents, and one or more carboxylic acids. In some embodiments, the first plant extracts is 15-18% of the first flavonoid mixture. In some embodiments, the one or more carrier solvents is 70-82% of the first flavonoid mixture. In some embodiments, the one or more carboxylic acids is 12-16% of the first flavonoid mixture.

In some embodiments, the second flavonoid mixture comprises a first batch ingredient mixture containing a second plant extracts, a third plant extracts, a fourth plant extracts, one or more carrier solvents, and one or more carboxylic acids. In some embodiments, the second plant extracts is 7-10% of the first batch ingredient mixture. In some embodiments, the third plant extracts is 7-10% of the first batch ingredient mixture. In some embodiments, the fourth plant extracts is 30-38% of the first batch ingredient mixture. In some embodiments, the one or more carrier solvents is 15-20% of the first batch ingredient mixture. In some embodiments, the one or more carboxylic acids is 22-26% of the first batch ingredient mixture.

In some embodiments, the second flavonoids mixture comprises a second batch ingredient mixture containing carrier solvents, one or more ester, and anti-oxidants.

In a second aspect, plant growth promoting solution comprises a first flavonoid mixture, a second flavonoid mixture, an ester and anti-oxidant mixture solution and a palm oil blend, wherein the first flavonoid mixture is heat treated at a temperature equal or higher than 85 degree C., wherein the second flavonoid mixture is non-heat treated.

In some embodiments, the first flavonoid mixture comprises a first plant extracts, one or more carrier solvents, and one or more carboxylic acids. In some embodiments, the first plant extracts is 15-18% of the first flavonoid mixture. In some embodiments, the one or more carrier solvents is 70-82% of the first flavonoid mixture. In some embodiments, the one or more carboxylic acids is 12-16% of the first flavonoid mixture.

In some embodiments, the second flavonoid mixture comprises a first batch ingredient mixture containing a second plant extracts, a third plant extracts, a fourth plant extracts, one or more carrier solvents, and one or more carboxylic acids. In some embodiments, the second plant extracts is 7-10% of the first batch ingredient mixture. In some embodiments, the third plant extracts is 7-10% of the first batch ingredient mixture. In some embodiments, the fourth plant extracts is 30-38% of the first batch ingredient mixture. In some embodiments, the one or more carrier solvents is 15-20% of the first batch ingredient mixture. In some embodiments, the one or more carboxylic acids is 22-26% of the first batch ingredient mixture.

In some embodiments, the second flavonoid mixture comprises a second batch ingredient mixture containing carrier solvents.

In a third aspect, plant growth promoting solution comprises a first flavonoid mixture, a second flavonoid mixture, and a palm oil blend, wherein the first flavonoid mixture and the second flavonoid mixture are non-heat treated, and wherein first flavonoid mixture comprises hydroxylated flavonol glycosides.

In some embodiments, the first flavonoid mixture comprises one or more carrier solvents, and one or more carboxylic acids. In some embodiments, the hydroxylated flavonol glycosides is 15-18% of the first flavonoid mixture. In some embodiments, the one or more carrier solvents is 70-82% of the first flavonoid mixture. In some embodiments, the one or more carboxylic acids is 12-16% of the first flavonoid mixture.

In some embodiments, the second flavonoid mixture comprises a first batch ingredient mixture containing a second plant extracts, a third plant extracts, a fourth plant extracts, one or more carrier solvents, and one or more carboxylic acids. In some embodiments, the second plant extracts is 7-10% of the first batch ingredient mixture. In some embodiments, the third plant extracts is 7-10% of the first batch ingredient mixture. In some embodiments, the fourth plant extracts is 30-38% of the first batch ingredient mixture. In some embodiments, the one or more carrier solvents is 15-20% of the first batch ingredient mixture. In some embodiments, the one or more carboxylic acids is 22-26% of the first batch ingredient mixture.

In an aspect of the present disclosure, a method of manufacturing a flavonoid combination solution is provided, including: preparing a first solution including at least one first plant extract, a first carrier solvent and a first carboxylic acid with heating under a predetermined temperature or without heating; preparing a second solution including at least one second plant extract, a second carrier solvent and a second carboxylic acid without heating; and mixing the first solution and the second solution to obtain the flavonoid combination solution; wherein the least one first plant extract and the least one second plant extract include at least one of flavones, flavonols, flavanones, and a derivative thereof.

Preferably, a ratio of the at least one first plant extract, the first fatty acid and the first carboxylic acid is 8-12 wt %: 35-40 wt %: 16-20 wt % based on a total weight of the first solution.

Preferably, a ratio of the at least one second plant extract, the second fatty acid and the second carboxylic acid is 30-40 wt %: 25-30 wt %: 16-21 wt % based on a total weight of the second solution.

Preferably, at least one of the first solution and the second solution further includes water, alcohols, vitamin C, 2-hydroxypropanoic acid, carbohydrates, monobasic esters, and any combination thereof.

Preferably, the second solution further includes resveratrol, trans-3,3',5,5'-tetrahydroxy-4'-methoxystilbene, yuccaols A-E, yuccaone A, larixinol, or any combination thereof.

Preferably, the least one first plant extract and the least one second plant extract are same or different to each other; the first carrier solvent and the second carrier solvent are same or different to each other; and the first carboxylic acid and the second carboxylic acid are same or different to each other.

Preferably, the at least one first plant extract and the least one second plant extract are extracted from citrus skin, grape seed, grape skin, wheat, rice, caper, radish leaves, buckwheat, celery, thyme, green peppers, or any combination thereof.

Preferably, the flavone is selected from a group consisting of rhoifoli, neodiosmin, or any combination thereof.

Preferably, the flavonol is selected from a group consisting of 3-hydroxyflavone, quercetin, kaempferol, myricetin, fisetin, galangin, isorhamnetin, pachypodol, rhamnazin, pyranoflavonols, furanoflavonols, or any combination thereof.

Preferably, the derivative of the flavonol includes flavonol glycosides.

Preferably, the flavonol glycoside is selected from a group consisting of kaempferol 3-O-rhamnoside-7-O-rhamnoside, quercetin, rutinoside, quercetin-3-O-rutinoside, isoquercetin, caffeoyl, luteolin, or any combination thereof.

Preferably, the flavanone is selected from a group consisting of butin, eriodictyol, hesperetin, hesperidin, neohesperidin, homoeriodictyol, isosakuranetin, naringenin, naringin, isonarinagin, pinocembrin, poncirin, sakuranetin, sakuranin, sterubin, pinostrobin, neoeriocitrin, or any combination thereof.

Preferably, triglyceride, glycerol, or any combination thereof are used.

Preferably, the first carboxylic acid and the second carboxylic acid are independently selected from a group consisting of carbonic acid, butanoic acid, ethanoic acid, malic acid, methanoic acid, pentanoic acid, hexanoic acid, decanoic acid, hexadecanoic acid, octadecanoic acid, or any combination thereof.

Preferably, the predetermined temperature is in a range of 40° C.-130° C.

Preferably, the step of mixing the first solution and the second solution further including adding a third fatty acid therein.

Preferably, the third fatty acid is selected from a group consisting of palm kernel olein, coconut oil, palm olein, palm oil, or any combination thereof.

In another aspect of the present disclosure, a flavonoid combination solution is manufactured by said manufacturing method.

In another aspect of the present disclosure, a method of enhancing plant growth development is provided, including a step of spraying or coating the flavonoid combination solution of claim 18 on at least one of leaves, stems, roots, fruits, flowers, and seeds of a plant, and/or a step of adding the flavonoid combination solution of claim 15 into soil for planting the plant.

In the present disclosure, one of the purposes is to cover wide range of functions of flavonoids in plant growth, development, propagation and protection against various adverse situations with biosynthetic path way.

DETAILED DESCRIPTION OF THE INVENTION

The foregoing and other aspects of the present disclosure will now be described in more detail with respect to other embodiments described herein. It should be appreciated that the invention can be embodied in different forms and should not be construed as limited to the embodiments set forth herein. Rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise.

The use of the term "or" in the claims is used to mean "and/or" unless explicitly indicated to refer to alternatives only or the alternatives are mutually exclusive, although the disclosure supports a definition that refers to only alternatives and "and/or."

Manufacturing the Flavonoid Mixture

Figure 1A:
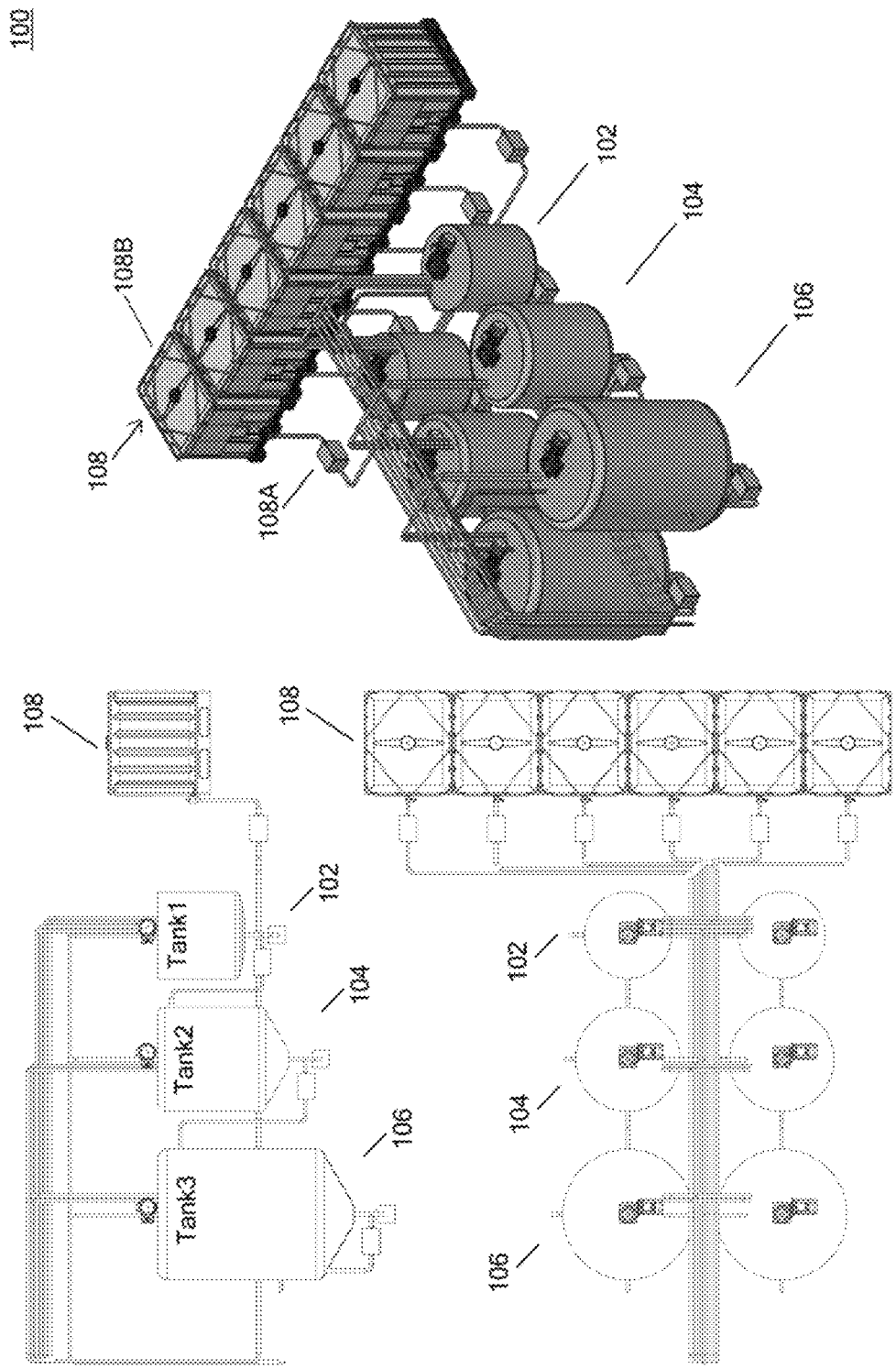
FIGS. 1A and 1B illustrates a flavonoid mixture solution plant 100 in accordance with some embodiments.
Figure 1B:
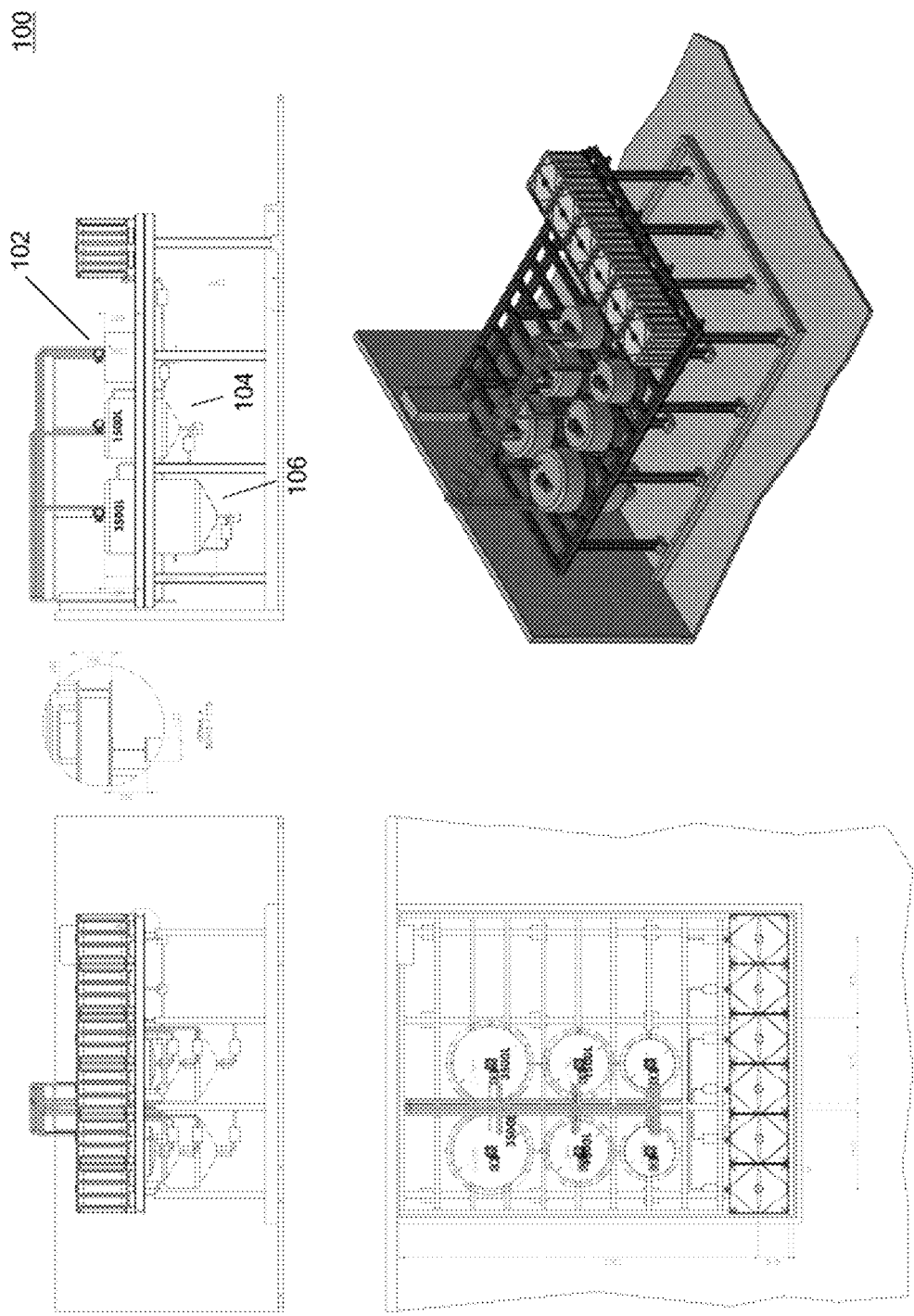

FIGS. 1A and 1B illustrates a flavonoid mixture solution plant 100 in accordance with some embodiments. FIG. 1A contains a prospective view, side view and top view of the plant 100. The plant 100 can contain Tank 1 102, Tank 2 104, and Tank 3 106. A person of ordinary skill in the art appreciates that any numbers of the Tanks and sizes are within the scope of the present disclosure. An ingredients storage 108 is coupled with one or more Tanks. Each of the ingredient's vessels 108B of the ingredients storage 108 contains an independently controlled valve 108A configured/structured to supply one or more ingredients in the ingredient's vessel 108B. Each of the ingredient vessel 108B can contain a pure ingredient or a mixture of an ingredients. The ingredient(s) can be solid, liquid, gas, or in a supercritical fluid state. A programmable computer can be installed with a software to control the supply of the ingredients to the tanks. Each of the tanks and/or ingredient vessel can couple with a valve or pump for ingredient transportation. Each of the tanks and ingredient vessels can contain a mixing mechanism, such as a motorized stirring rod or any other mixing devices. Each of the tanks and ingredient vessels can contain a temperature control, such as a heater or cooling devices.

In the following, three illustrative manufacturing processes are disclosed, including Exemplary Process 1, Exemplary Process 2, and Exemplary Process 3.

Exemplary Process 1

Figure 1C:
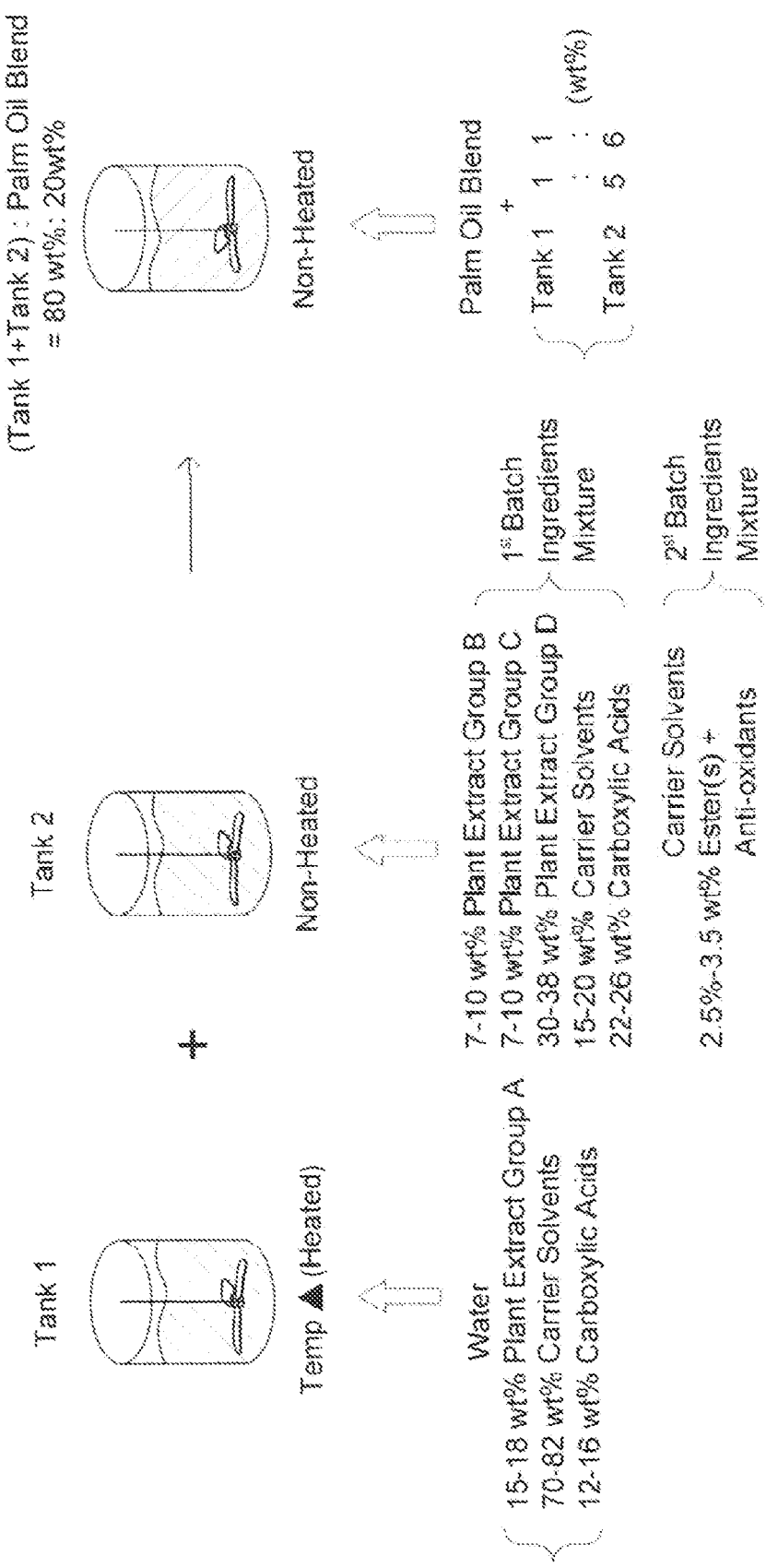
FIGS. 1C, 1D, and 1E illustrate exemplary Processes 1, 2, 3 in accordance with some embodiments.

FIG. 1C illustrates an exemplary Process 1 in accordance with some embodiments. Process 1 includes a) forming a Tank 1 solution: mixing and heating a mixture having a plant extract group A, a fatty acid carrier solvent group, a carboxylic acid group to form a solution or slurry; b) forming a Tank 2 first batch ingredient solution: adding water and mixing a $1^{st}$ batch of ingredients having a plant extract group B, a plant extract group C, a plant extract group D, a carrier solvent group, a carboxylic acid group; c) forming a Tank 2 solution: adding and mixing a $2^{nd}$ batch ingredients to the Tank 2 first batch ingredient solution; d) forming a Tank 1 plus Tank 2 mixture solution: mixing the Tank 1 solution and the Tank 2 solution (wt % 1:5 or 1:6) into Tank 3, and e) forming a tank 3 solution: adding and mixing an amount of palm oil blend to the Tank 1 plus Tank 2 solution.

Tank # and reference numbering (e.g., 102) used herein be read together with the reference numbers in FIGS. 1A and 1B).

Tank 1

Tank 1—Preparing Process

Processing steps of Tank 1 102 is discussed in the following. A predetermined amount/ratio of plant extract group A, carrier solvent group, and carboxylic acid group (solvents) are added to the Tank 1 102 with a mixing/stirring motion at a predetermined heated temperature forming a Tank 1 solution. In some embodiments, the Tank 1 solution can be a slurry. In some embodiments, the ingredients are able to be added one by one in sequence. In some embodiments, the ingredients are able to be added one concurrently.

In some embodiments, the predetermined heated temperature is between 85° C. to 100° C. In other embodiments, the heated predetermined temperature is equal or greater than 65° C. In other embodiments, the predetermined heated temperature is equal or greater than 85° C.

Tank 1—Compositions

In some embodiments, the weight percentage of plant extract group A is between 15%-18%, carrier solvent group is around 70%-82%, and carboxylic acid group is 12%-16%. Unless specifically specified, the percentages disclosed in the Present Disclosure are weight percentages. All the percentages disclosed should be adjusted to 100% as appreciated by a person of ordinary skill in the art.

Figure 4:
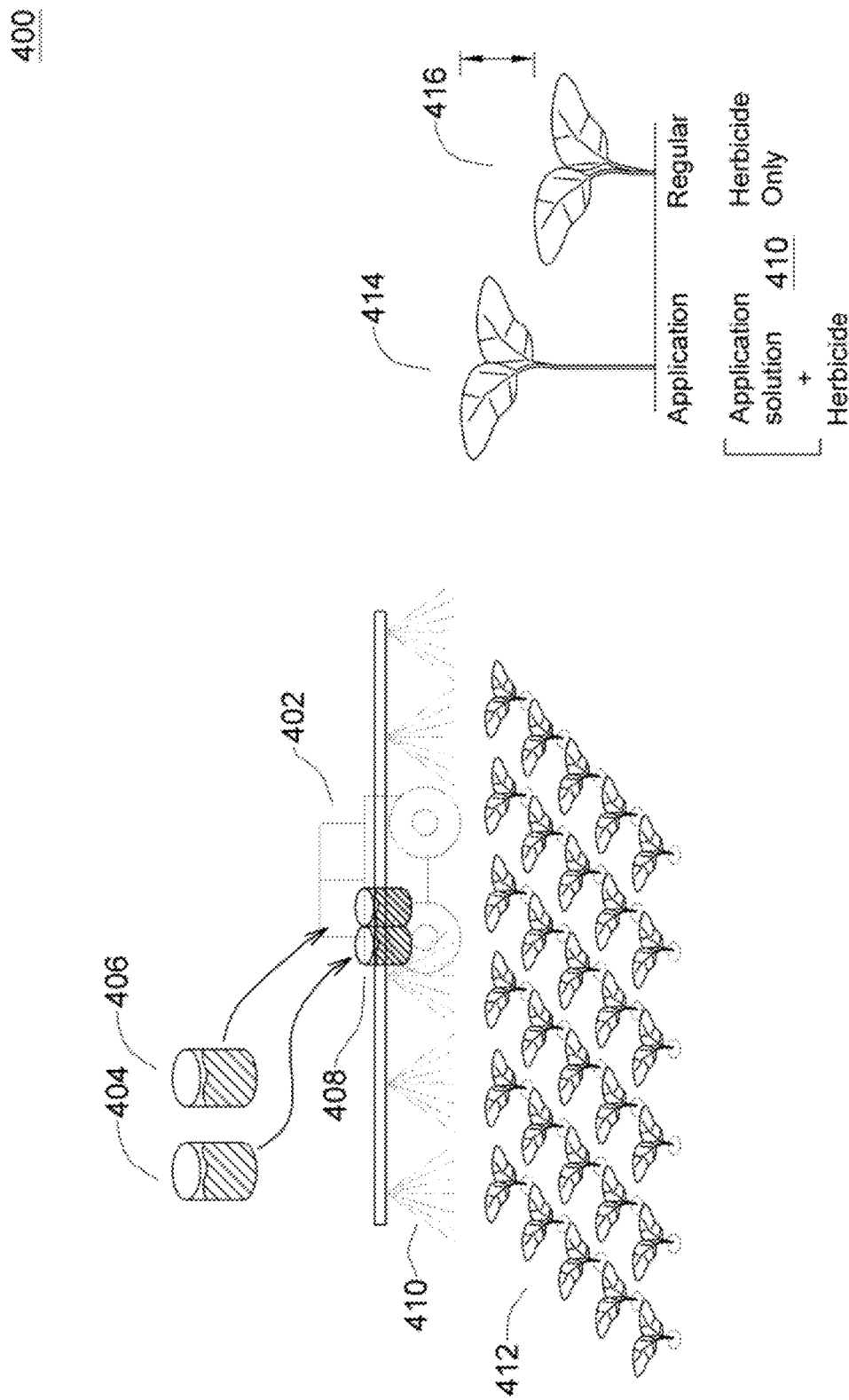
FIG. 4 illustrates a plant stunting effect-preventing method 400 in accordance with some embodiments.

Plant extract group A include extracts from buckwheat 2%-4%, celery 1%-4%, thyme 2%-4%, green peppers 1%-3%, citrus aurantium 7%-14%, citrus, pagoda, FIG. 4%-7% or a combination thereof. In some embodiments, the plant extract group A includes flavonol glycocides/acetylated glycosides. In some embodiments, the plant extract group A includes kaempferol 3-O-rhamnoside-7-O-rhamnoside, quercetin, rutinoside, quercetin-3-O-rutinoside, isoquercetin, caffeoyl, luteolin, or any combination thereof.

The extraction of various flavonoid groups in the present disclosure can use: $Ca(OH)_2$ 1% and $Na_2B_4O_7 \cdot 5H_2O$ 1% as a solvent.

In some embodiments, triglyceride, glycerol, or any combination thereof are used.

Carboxylic acid group includes carbonic acid, butanoic acid, ethanoic acid, methanoic acid, pentanoic acid, hexanoic acid, decanoic acid, hexadecanoic acid, octadecanoic acid, or any combination there. In some embodiments, the carboxylic acid is 6%-13% of the solution of tank 1, wherein the acetic/ethanoic acid is 5%-8% and the pentanoic/hexanoic acid is 3-5%

Tank 2

Tank 2—Preparing Process

Processing steps of Tank 2 104 is discussed in the following. A predetermined amount/ratio of plant extract group B, plant extract group C, plant extract group D, (or carrier solvents, and carboxylic acids (solvents) are added to the Tank 2 104 with a mixing/stirring motion at a predetermined non-heated temperature forming a $1^{st}$ batch ingredient mixture.

Next, Tank 2 solution is formed: $2^{nd}$ batch ingredient mixture (containing one or more esters and/or anti-oxidants) are added to the $1^{st}$ batch ingredient mixture at a non-heated predetermined temperature.

In some embodiments, the non-heated predetermined temperature is at a room temperature, such as between 20°-30° C. In other embodiments, the non-heated predetermined non-heated temperature is equal or below 20 degree C. The non-heated predetermined temperature can be the temperature disclosed above throughout the Present Disclosure. The non-heated temperature includes a temperature that does not high enough that would cause the ingredients in Tank 2 (plant extracts B, C, D) damaged (e.g., ring breaks open or change its chemical structure).

Tank 2—Compositions

In some embodiments, the weight percentage of the $1^{st}$ batch ingredient mixture includes a plant extract group B around 7%-10%, a plant extract group C around 7%-10%, a plant extract group D around 30%-38%, a carrier solvent group around 70%-82%, and a carboxylic acid group 12%-16%. Unless specifically specified, the percentages disclosed in the Present Disclosure are weight percentages.

Plant extract group B can include saponins. Saponins herein can include 4-6 wt % of trans-3,3 ',5,5'-tetrahydroxy-4'-methoxystilbene, 7-9 wt % of yuccaols A-E, 4-6 wt % of yuccaone A, 2-4 wt % of larixinol, and 1.5-3 wt % of resveratrol.

Plant extract group C include extracts from citrus aurantium, grape extracts, or a combination thereof. Plant extract group C can include flavones. Flavones herein can include butin, eriodictyol, hesperetin, hesperidin, neohesperidin, homoeriodictyol, isosakuranetin, naringenin, naringin, isonarinagin, pinocembrin, poncirin, sakuranetin, sakuranin, sterubin, pinostrobin, neoeriocitrin, or any combination thereof.

Plant extract group D include extracts from citrus aurantium, grape extracts, radish leaves, or a combination thereof. Plant extract group D can include flavonol or 3-hydroxyflavone. Flavonol or 3-hydroxyflavone herein can include quercetin, kaempferol, glycoside, myricetin, fisetin, galangin, isorhamnetin, pachypodol, rhamnazin, pyranoflavonols, furanoflavonols or any combination thereof.

In some embodiments, triglyceride, glycerol, ethanol or any combination thereof are used.

Carboxylic acid group include herein includes carbonic acid, butanoic acid, ethanoic acid, malic acid, methanoic acid, pentanoic acid, hexanoic acid, decanoic acid, hexadecanoic acid, octadecanoic acid, or any combination thereof.

$2^{nd}$ Batch Ingredient Mixture

In some embodiments, the $2^{nd}$ batch ingredient mixture has the weight percentage of carrier solvents around 18%-28% and ester and/or antioxidant group in a range of 2.5%-3.5%.

In some embodiments, triglyceride, glycerol, ethanol or any combination thereof are used.

Ester and/or antioxidant group herein include monobasic esters, vitamin C, 2-hydroxypropanoic acid, or a combination thereof.

Tank 3

Tank 3—Preparing Process

The solution in the Tank 3 106 is formed, by adding Tank 1 and Tank 2 prepared above into Tank 3 106. An amount of palm oil blend is added to the Tank 3 106 forming a solution of Tank 3. The solution of tank 3 can comprise 80% wt of solutions from Tank 1 and Tank 2 while having 20% of the palm oil blend.

Tank 3—Compositions

A palm oil blend group herein can include palm kernel oil, palm kernel olein, coconut oil, palm olein, palm oil, or any combination thereof.

Exemplary Process 2

Figure 1D:
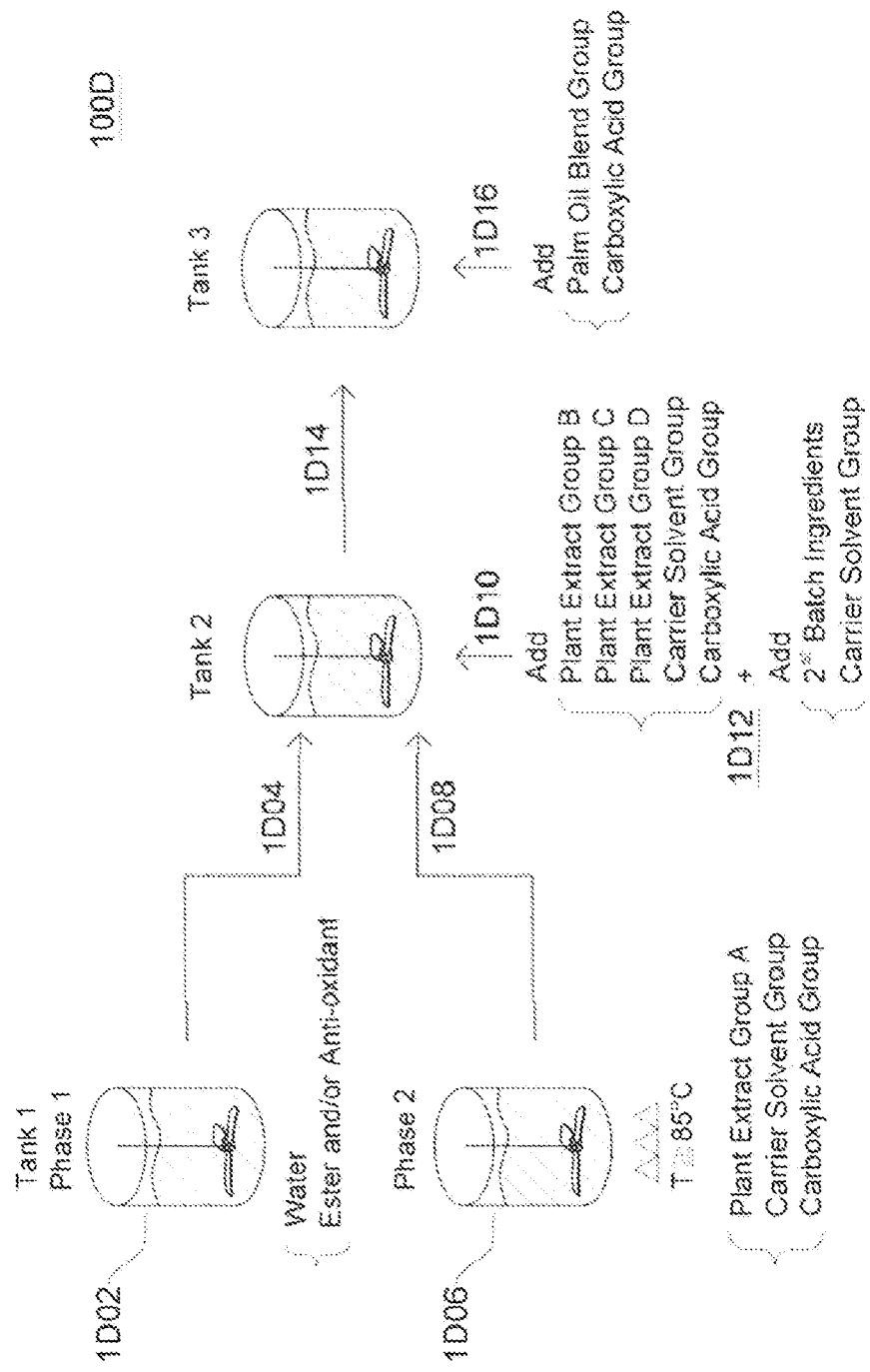

FIG. 1D illustrates an exemplary Process 2 in accordance with some embodiments. Process 2 includes a) i) Step 1D02, forming a Tank 1 Phase 1 solution: mixing (e.g., stirring) a mixture of water and an ester and/or anti-oxidant group 1 hour, wherein the ester and/or anti-oxidant group can be 25-35 wt %, and water is the remaining 65-75 wt % a) ii) Step 1D04, transferring the Tank 1 Phase 1 solution to Tank 2, b) Step 1D06, forming a Tank 1 Phase 2 solution: mixing and heating (e.g., 85 degree C. or above) a fatty acid group, a plant extract group A, a carboxylic acid group for 3-4 hours c) Step 1D08, the Tank 1 Phase 2 solution is added to the Tank 2 (e.g., mixing the solution to the slurry), d) Step 1D10, adding a plant extract group B, a plant extract group C, a plant extract group D, a fatty acid group, a carboxylic acid group to the Tank 2 while keep mixing and stirring, e) Step 1D12, adding a $2^{nd}$ batch ingredients to the Tank 2 while keep mixing and stirring, f) Step 1D14, the solution in the Tank 2 is transferred to the Tank 3, and g) Step 1D16, palm oil blend group and carboxylic acid group are added to the Tank 3.

Process 2—Compositions

In some embodiments, the compositions and respective ratio are same as described above, which will not be repeated here for succinctness.

Exemplary Process 3

Figure 1E:
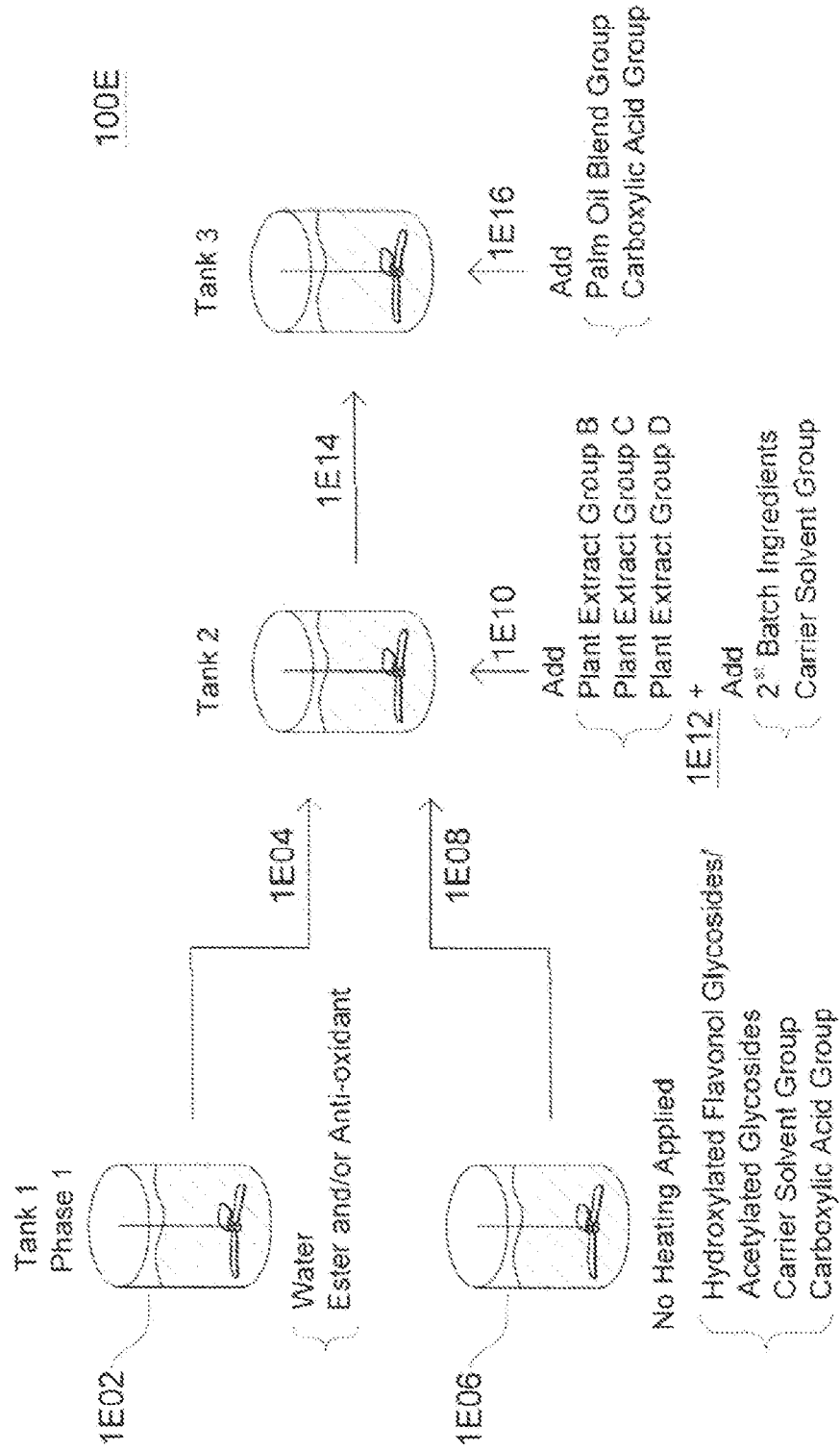

FIG. 1E illustrates an exemplary Process 3 in accordance with some embodiments. Process 3 includes a) i) Step 1E02, forming a Tank 1 Phase 1 solution: mixing (e.g., stirring) a mixture of water and an ester and/or anti-oxidant group for 1 hour, wherein the ester and/or anti-oxidant group can be 25-35 wt %, and water is the remaining 65-75 wt % a) ii) Step 1E04, transferring the Tank 1 Phase 1 solution to Tank 2, b) Step 1E06, forming a Tank 1 Phase 2 solution: mixing (without heating) a fatty acid group, a hydroxylated plant extract group A (hydroxylated flavonol glycosides/acetylated glycosides), a carboxylic acid group for 1 hour, c) Step 1E08, the Tank 1 Phase 2 solution is added to the Tank 2 (e.g., mixing the solution to the slurry), d) Step 1E10, adding a plant extract group B, a plant extract group C, a plant extract group D, a fatty acid group, a carboxylic acid group to the Tank 2 while keep mixing and stirring, e) Step 1E12, adding a 2nd batch ingredients to the Tank 2 while keep mixing and stirring, f) Step 1E14, the solution in the Tank 2 is transferred to the Tank 3, and g) Step 1E16, palm oil blend group and carboxylic acid group are added to the Tank 3.

Process 3—Compositions

In some embodiments, the compositions and respective ratio are same as described above, which will not be repeated here for succinctness.

Figure 1F:
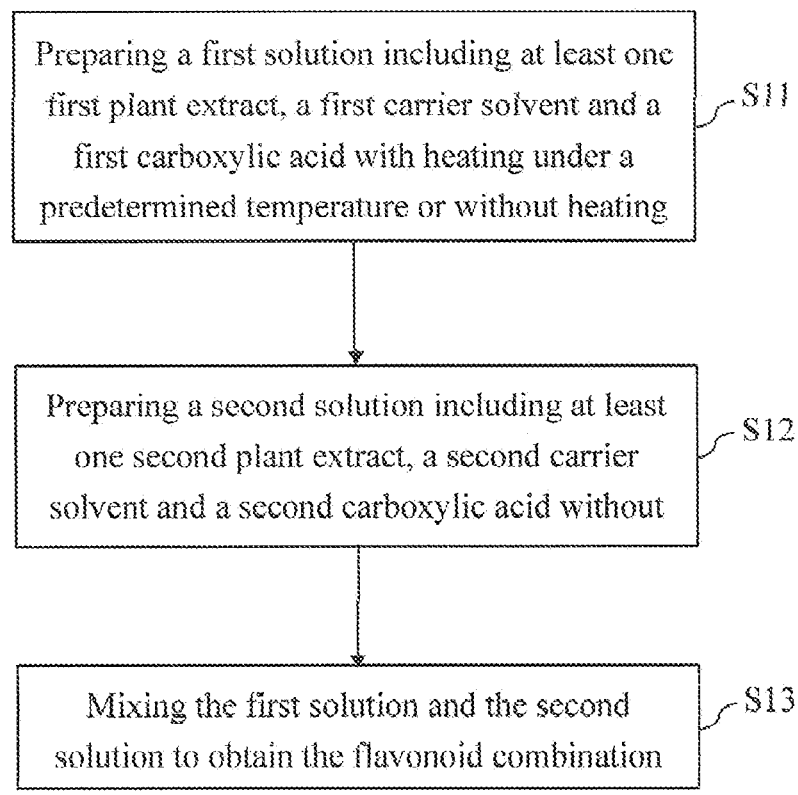
FIG. 1F illustrate an exemplary Processes in accordance with some embodiments.

Please refer to FIG. 1F, which is a flow chart illustrates another method of manufacturing a flavonoid combination/mixture solution in accordance with some embodiments.

In Step S11, a first solution (including at least one first plant extract, a first carrier solvent and a first carboxylic acid) is prepared with heating under a predetermined temperature. In some embodiments, no additional heating or avoid heating is performed in a first tank. In some embodiments, a temperature control of no higher than a predetermined temperature (e.g., 40 degree C.) is performed in a first tank.

In some embodiments, the first solution is formed by mixing three different groups of the first plant extracts, a group of the first carrier solvents, and a group of the first carboxylic acids in the first tank. In some embodiments, the first plant extracts are selected based on a criterion that flavonoids included in the first plant extracts are capable of withstanding a heated environment, such as the temperature described below. In some embodiments, one, two or all three groups of the first plant extracts, the group of first carrier solvents, and the group of first carboxylic acids are mixed and heated to a temperature allowing the flavonoids to be dissolved in a carrying agent to obtain the first solution, which can be a homogeneous solution, such that the carrying agent is served as a solvent. In some embodiments, the first carrier solvents are used as the carrying agent. In some embodiments, no external water is added to the first solution, so that the first solution includes only the ingredients mentioned above.

In some embodiments, a heater can be used to provide a predetermined temperature to the first solution in the first tank. A stirrer can be used for mixing the first solution with various ingredients. In some embodiments, the temperature that is used to heat the first solution is in a range of 40° C.-130° C., preferably 45° C.-120° C. In some embodiments, the predetermined temperature used to heat the first solution is greater than 85° C. In some embodiments, the predetermined temperature used to heat the first solution is greater than 65° C.

In some embodiments, the method of manufacturing a flavonoid combination solution includes first adding the group of first carrier solvents to a first tank and heating to 50° C. Then, the $1^{st}$ group of first plant extracts is added to the first tank, heated up to 90° C. and kept stirred. Next, the $2^{nd}$ and the $3^{rd}$ groups of first plant extracts are added to the first tank. After that, the group of first carboxylic acids are added to the first tank and heated up to 100° C. to 120° C. The temperature disclosed above are used to facilitate the groups of first plant extracts to be dissolved in the first solution. In some embodiments, the reaction time (e.g., the heating duration) is between 2-5 hours.

In some embodiments, the $1^{st}$ group of first plant extract is extracted from the skin of citrus, including bitter orange, Seville orange, sour orange, biggarade orange, marmalade orange, or any combination thereof. In some embodiments, the first group of first plant extracts includes extracts from grape seed, grape skin, or any combination thereof. In some embodiments, the $1^{st}$ group of first plant extracts includes extracts from wheat, including fagopyrum esculentum (e.g., Japanese buckwheat, buckwheat), rice (e.g., japonica rice, arbirui rice, basmati rice, brown rice, jasmine rice, white rice, or any combination thereof), and/or caper. In some embodiments, the $1^{st}$ group of first plant extracts includes at least one extracts from the plants or skin of plants mentioned above.

In some embodiments, solvent (e.g., water, organic solvent, and supercritical fluids) extraction methods are used to perform the extraction of the groups of first plant extracts. The methods of extraction include alcohol extraction methods; micro cutting of the plant materials and/or then performing extraction using alcohols (e.g., methanol/ethanol) or water; and/or a cellular disruption technology process and then performing extraction via alcohols or water. Different groups of first plant extracts are able to be added to have a symbiosis effect.

In some embodiments, the $1^{st}$ group of first plant extracts includes a high concentration of flavones and flavanones. The flavanones may include butin, eriodictyol, hesperetin, hesperidin, neohesperidin, homoeriodictyol, isosakuranetin, naringenin, naringin, pinocembrin, poncirin, sakuranetin, sakuranin, sterubin, pinostrobin, or any combination thereof.

In some embodiments, the $2^{nd}$ group of first plant extracts is extracted from the skin of citrus (e.g., citrus aurantium), including bitter orange, Seville orange, sour orange, biggarade orange, marmalade orange, or any combination thereof. In some embodiments, the $2^{nd}$ group of first plant extracts includes extracts from grape seed, grape skin, or any combination thereof. In some embodiments, the $2^{nd}$ group of first plant extracts includes extracts from radish leaves. In some embodiments, the $2^{nd}$ group of first plant extracts includes at least one extracts from each of the plants mentioned above.

In some embodiments, the $2^{nd}$ group of first plant extracts includes a high concentration of flavonols. The flavonols include 3-hydroxyflavone, quercetin, kaempferol, myricetin, fisetin, galangin, isorhamnetin, pachypodol, rhamnazin, pyranoflavonols, furanoflavonols or any combination thereof.

In some embodiments, the $3^{rd}$ group of the first plant extract is extracted from buckwheat, celery, thyme, green peppers, citrus, or any combination thereof. In some embodiments, the $3^{rd}$ group of the first plant extract includes flavonol glycosides/acetylated glycosides. The flavonol glycosides can include kaempferol 3-O-rhamnoside-7-O-rhamnosid, quercetin, rutinoside, quercetin-3-O-rutinoside, isoquercetin, caffeoyl, luteolin, or any combination thereof.

In some embodiments, triglyceride, glycerol, or any combination thereof are used. In some embodiments, the group of first carboxylic acids includes carbonic acid, butanoic acid, ethanoic acid, malic acid, methanoic acid, pentanoic acid, hexanoic acid, decanoic acid, hexadecanoic acid, octadecanoic acid, or any combination thereof. Other organic acids can also be used, so long as the organic acid provides a function of as a pH adjuster, surfactant, efficient carrier, and penetrating of cell membranes on plants and pathogens. For example, an organic acid with a 6 carbons chain or higher is used to penetrate the cell membranes, such that the effective ingredients (e.g., flavonoids) can be absorbed or enter into the plant's fluid transportation system or pores much faster, more efficient, and/or more effective.

In some embodiments, the total flavonoids in the first solution includes 40 wt %-45 wt % of flavonoids based on a total weight of the first solution, and other substances, such as tannins, for the remaining portion.

In Step S12, a second solution including at least one second plant extract, a second fatty acid and a second carboxylic acid is prepared without heating in a second tank.

A blend of one or more flavanones, one or more flavones, or one or more flavonols are added in the second solution in the second tank. A stirrer is used to mix the ingredients. In some embodiments, the second tank is kept at room temperature. In some embodiments, the second tank is maintained below 50° C. to prevent a negative chemical effect to the flavonoids in the second tank. In some embodiments, the second solution in the second tank includes heat sensitive flavonoids, so that it is intentionally kept the second solution below a predetermined temperature that prevents a chemical reaction from occurring, such as dimerization, decomposition due to heat, or polymerizations. In some embodiments, the flavonoids in the second solution are suspended in the solvent and are not dissolved. In some embodiments, no additional or external water is added to the second solution, so that only the above-mentioned ingredients are added to the section solution.

In some embodiments, the one or more flavanones, the one or more flavones, and/or the one or more flavonols are extracted from plants, which can be obtained from the plants (including fruits, seeds, etc.) listed above in Step S11. In some embodiments, the blend includes saponins, such as resveratrol, trans-3,3',5,5'-tetrahydroxy-4'-methoxystilbene, yuccaols A-E, yuccaone A, larixinol; and flavonoids, such as neoeriocitrin (2-5 wt %), isonarinagin, naringin (1-3 wt %), hesperidin, neohesperidin, poncirin (2-5 wt %), naringenin (1-3 wt %), hesperetin (0-3 wt %), or any combination thereof. In some embodiments, the second solution includes one or more flavones including rhoifoli and neodiosmin.

In some embodiments, the second solution includes second fatty acids, triglyceride and/or glycerol. The second fatty acids can be used as a carrying agent and/or solvent. In some embodiments, the second solution includes second carboxylic acids, which can be carbonic acid, butanoic acid, ethanoic acid, malic acid, methanoic acid, pentanoic acid, hexanoic acid, decanoic acid, hexadecanoic acid, octadecanoic acid, or any combination thereof. In some embodiments, the second solution includes one or more alcohols (such as ethanol and/or resveratrol), vitamin C, 2-hydroxypropanoic acid, carbohydrates, and/or monobasic esters.

In some embodiments, the total flavonoids in the second solution includes 30-40 wt %, preferably 30-38 wt %, of flavonoids based on a total weight of the second solution, and other substances, such as fatty acids, carboxylic acids, or tannins, for the remaining portion.

In Step S13, the first solution and the second solution are mixed to obtain the flavonoid combination solution in a third tank.

The first solution of the first tank and the second solution of the second tank are added to the third tank. In some embodiments, phenylpropanoids, and fatty acids are added, wherein the fatty acids may include palm kernel oil, palm kernel olein, coconut oil, palm olein, palm oil, or any combination thereof. In some embodiments, an amount of carboxylic aids and water are added to the third tank. In some embodiments, the phenylpropanoids (e.g., eugenol) are essential oils, which can be extracted from clove, nutmeg, cinnamon, and/or basil. A stirrer is used to mix and stir the solution.

A solution including various flavonoids (i.e. flavonoid combination solution) is obtained. The flavonoid combinations solution includes one or more flavones, one or more flavanones, one or more flavonols, one or more flavonol glycosides, one or more carrier solvents, one or more organic acids (e.g., carboxylic acids), one or more oils (e.g., essential oils), or any combination thereof. In some embodiments, the flavonoid combinations solution is a water-based (e.g., using water as the solvent) liquid solution.

In some embodiments, the final product solution (i.e. flavonoid combination solution) includes 35-40 wt % of flavonoids based on a total weight of the flavonoid combination solution, and the remaining substances including tannins.

Examples of Preparing the a Flavonoid Solution

In Tank 1, the following materials are provided and mixed with heating to >85° C. or without heating to prepare a first solution, and wt % is calculated based on the total weight of the first solution:

(1) 3-6 wt % Water;
(2) 18-21 wt % triglyceride and 11-16 wt % glycerol;
(3) First plant extracts including a group of flavonol glycosides including 1-2 wt % kaempferol 3-O-rhamnoside-7-O-rhamnoside, 9-15 wt % quercetin, 3-5 wt % rutinoside, 2-4 wt % quercetin-3-O-rutinoside, 1-2 wt % isoquercetin, 0.6-1 wt % caffeoyl, and 1.6-27 wt % luteolin; and
(4) First carboxylic acids including 11-14 wt % carbonic acid, 2-3 wt % butanoic acid, 2-3 wt % ethanoic acid, 2-3 wt % methanoic acid, 3-4 wt % pentanoic acid, 2-3 wt % hexanoic acid, 3-4.5 wt % decanoic acid, 1-2 wt % hexadecanoic acid, and 1-2 wt % octadecanoic acid.

In Tank 2, the following materials are provided and mixed without heating to prepare a second solution, and wt % is calculated based on the total weight of the second solution:

(1) Saponins including 1.5-3 wt % resveratrol, 4-6 wt %_trans-3,3',5,5'-tetrahydroxy-4'-methoxystilbene, 7-9 wt % yuccaols A-E, 4-6 wt % yuccaone A, and 2-4 wt % larixinol;
(2) Second plant extracts including a group of flavanones including 1-2 wt % butin, 0.2-0.5 wt % eriodictyol, 1.6-2.1 wt % hesperetin, 6-8 wt % hesperidin, 1-3 wt % homoeriodictyol, 2-3 wt % isosakuranetin, 1-2 wt % naringenin, 20-30 wt % naringin, 1-2 wt % pinocembrin, 4-6 wt % poncirin, 1-2 wt % sakuranetin, and 1-2 wt % sakuranin; and a group of flavanols including 6-7 wt % 3-hydroxyflavone, 4-6 wt % quercetin, 1-2 wt % kaempferol, 1-1.5 wt % myricetin, 1-2 wt % fisetin, 1-2 wt % galangin, 0.5-1 wt % isorhamnetin, 0.5-1 wt % pachypodol, 0.5-1 wt % rhamnazin, 1-1.5 wt % pyranoflavonols, and 1-2 wt % furanoflavonols;
(3) 10%-15% wt % triglyceride and 15%-20% wt % glycerol;
(4) Second carboxylic acids including 3-5 wt % carbonic acid, 0.5-1 wt % butanoic acid, 2.5-3 wt % ethanoic acid, 0.3-0.6 wt % methanoic acid, 0.6-0.9 wt % pentanoic acid, 0.3-0.6 wt % hexanoic acid, 0.4-0.8 wt % decanoic acid, 0.5-1 wt % hexadecanoic acid, and 2-3 wt % octadecanoic acid;
(5) 2-7 wt % Ethanol;
(6) 3-6 wt % Monobasic ester;
(7) 1-3 wt % Vitamin C; and
(8) 0.1-0.3 wt % 2-hydroxypropanoic acid.

In Tank 3, a palm oil blend including palm kernel oil, palm kernel olein, coconut oil, palm olein, palm oil is further provided. The first solution in Tank 1 and the second solution in Tank 2 are added into Tank 3 to mix and stir to each other so as to obtain the flavonoid combination solution of the present disclosure.

Applications of the Flavonoid Solution

In some embodiments, the flavonoid combination solution of the present disclosure is applied to enhance plant growth development, which includes activation of plant growth rate, metabolic signals, carbon dioxide absorption rate, carbon dioxide utilization, photosynthesis, seed germination, pollen germination, tuber size, root growth, yield, fruit size, regulation of soil microbial composition, beneficial symbiosis, change of chemical and physical traits of the soil, protection against unbeneficial insects, pathogens or nematodes, post-harvest resistance, improvement of transfer of infection, pollinator attraction, color enhancement, plant health, harvest maturity, nutrient uptake, or any combination thereof.

By applying the flavonoid combination solution of the present disclosure to the leaves, stems, roots, fruits, flowers, and seeds of plants and/or soil, the following one or more advantages are achieved;

(1) The flavonoid combination solution disclosed herein is able to open the photosynthesis channels of the plants, so that the photon conversion rate of the plants is increased.
(2) The flavonoid combination solution disclosed herein helps the plant to produce its own range of secondary metabolites.
(3) The flavonoid combination solution disclosed herein activates the "Calchone synthase"—which is the backbone of flavonoid production, causing increased photosynthesis, increased root exudates, healthier and more efficient root systems, activation of the natural defense mechanisms, balance of the plants hormone levels. In detail, the formulation in the flavonoid combination solution activates the "metabolic signals" in plants, causing the photosynthesis tempo to increase, as well as increase in chlorophyll. This leads to healthier plants that grows better and have healthier root systems. All surplus carbon-compounds are stored in the plant cells and alsoexcreted through the roots into the soil, which then can be served as increased food source for soil microbes that live in symbiosis with the plants root systems. The increased numbers of beneficial microbes have a positive effect on the suppression of various pathogens and nematodes as well as making available minerals that previously was not available for plant use. Therefore, the flavonoid combination solution has an indirect positive effect on soil health by helping the plants to release more organic carbon into the soil—Carbon sequestration.
(4) Normally, when herbicides are applied on plants, the growth of the plants, such as rice, will delay for at least 2 weeks. By using with the flavonoid combination solution disclosed herein, it reverses the effect. (e.g., when the flavonoid combination solution is used with herbicides together to be applied on plants, it eliminates the stunting effect caused by the herbicides.)
(5) The flavonoid combination solution disclosed herein is applied on plants help to concentrate flavonoids in the periderm of the plant for assisting the plant against wilt disease.
(6) The flavonoid combination solution disclosed herein is used in postharvest resistance of fruits and vegetables. High concentration of the active components of the flavonoid combination solution in fruits goes parallel with low incidence of pathogens; thus, fruits are usually more resistant to fungal decay.
(7) By using the flavonoid combination solution disclosed herein, infection of plant diseases is slower than the control (e.g., the plants without using the solution).
(8) When the flavonoid combination solution disclosed herein is applied, the plant is reacting by changing the normal rigid state of plant cells, which causes the outward pressure of the water content of each cell on its membrane.
(9) The flavonoids disclosed herein enhance the plants to perform the following functions. Plants have several popular regulatory metabolites to control the flower color, flower initiation, fruit set, less fruit drop, flavoring factors, pollination, pollen tube germination, harmful UVB protection, inhibit efflux of auxin from plant cell, seed maturation and seed coat browning, seeds and spore germination, plant growth and development and establish themselves against biotic and abiotic stress conditions. These metabolites are effective in temperature stress, drought situation, freezing injuries of cell membranes and unusual salinity. The flavonoid combination solution acts as signal molecules to take preventive measures in order to save them from pathogenic microbial attack; and responsible for unique colors of flowers and fruit which are necessary for pollination and subsequently fruit dispersion in different places and thus help in reproduction.

The method of enhancing plant growth development includes to spray or coat the flavonoid combination solution made by said process on at least one of leaves, stems, roots, fruits, flowers, and seeds of a plant, and/or add said flavonoid combination solution into soil for planting the plant. In some embodiments, the plants to be applied can be oats, wheat, canola, barley, lupines, apples, grapes, plums, pears, pome fruit, stone fruit, potatoes, tomatoes, onions, lettuce, brassicas, cabbage, cucumbers, sunflowers, etc.

In some embodiments, the flavonoid combination solution is further diluted to a predetermined concentration, e.g., 0.5 ml of the concentrated solution as prepared above added with 1 L water, before applying to the plant. In some embodiments, the plant is exposed to proper sunlight. In some embodiments, the flavonoid combination solution is sprayed in a form of mist on the surface of a plant.

Figure 2:
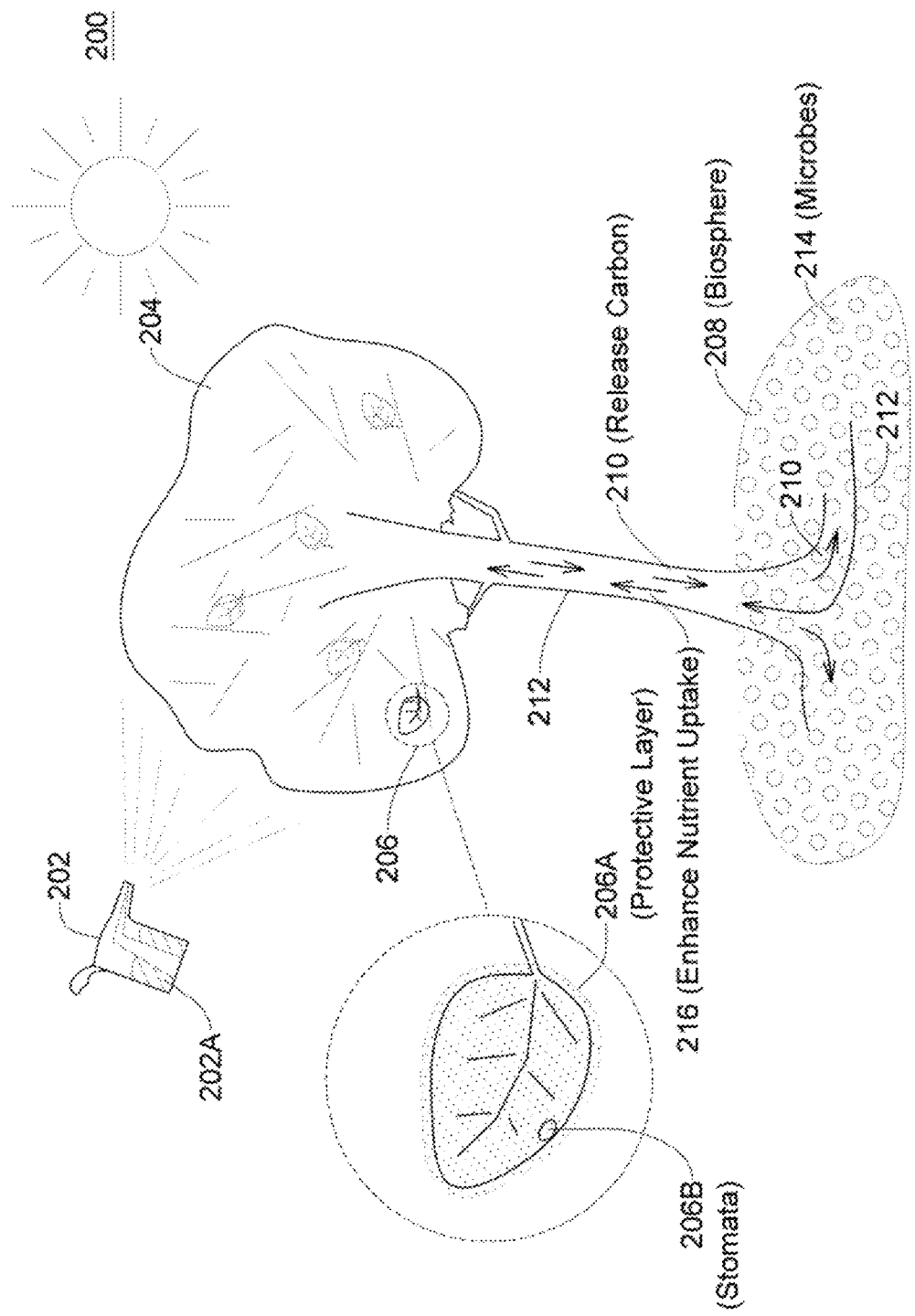
FIG. 2 illustrates a plant growth enhancing method 200 in accordance with some embodiments.

FIG. 2 illustrates a plant growth enhancing method 200 in accordance with some embodiments. In some embodiments, a plant's plant growth s enhancing solution 202 is prepared. The solution 202 can be applied on a plant 204 using an application apparatus (e.g., a sprayer or a spraying bottle). The solution 202 regulates plant's physiological behaviors and enhances the plant's growth. The increase of photosynthesis and chlorophyll and the enhancement of the growth of the plants 204 makes the plants store more energy and transmits signals 212 to enhance root exudates and release carbon 210 to the soil, which in turn increases stimulation of symbiosis of the microorganisms 214 in the soil forming a microbes beneficial biosphere 208. With more dense and extended roots growth, the plant 204 is able to absorb more nutrients 216 from the soil. Further, with the better ability of absorbing nutrients by the roots, the plant 204 sends a growth signal to the top portion of the plants. As a result of applying the solution 202 to the plants, the experimental results show significant fruit yield increases, more leaves in numbers and higher density of leaves are generated, plant's resistance to stress is increased, root exudates increases, plant's photosynthesis rate increases, stimulation of symbiosis with arbuscular mychorrhizal fungi increases, fruit quality increases due to increased phenolic/anti-oxidant content in fruit, environmental stress (e.g., NaCl-stress) alleviates, and secondary metabolites increases.

In some embodiments, the solution 202 contains active ingredients 202A that are extracts of *Citrus aurantium*, organic acids, and extracts of plants with flavonoids, including blueberry. In some embodiments, the solution 202 is the flavonoid solution/flavonoid combination solution disclosed herein.

In some embodiments, the solution 202 meets the requirement of organic certification, such as USDA ORGANIC and OMRI Certification.

In some embodiments, the solution 202 has a concentration in a range of 0.05% to 0.1% of the active ingredients 202A with the remaining portion is water. In other embodiments, the solution 202 has a concentration of 0.05% of the active ingredients 202A.

In some embodiments, the solution 202 contains organic acid, such as hexanoic acid, octanoic acid, decanoic acid, or a combination thereof. Any other fatty acids are within the scope of the present disclosure. The organic acids are used to help the active ingredient penetrate the cell structure or tissue of the leaves, so that the active ingredients are able to be absorbed by the plants.

In some embodiments, the solution 202 also enhance/ extending the opening of the stomata 206B, which enhances the photosynthesis of the plants. In some embodiments, the solution 202 applied on the surface of the leaves forming a protecting layer 206A, which reduces the infection of bugs and plant diseases.

Figure 3:
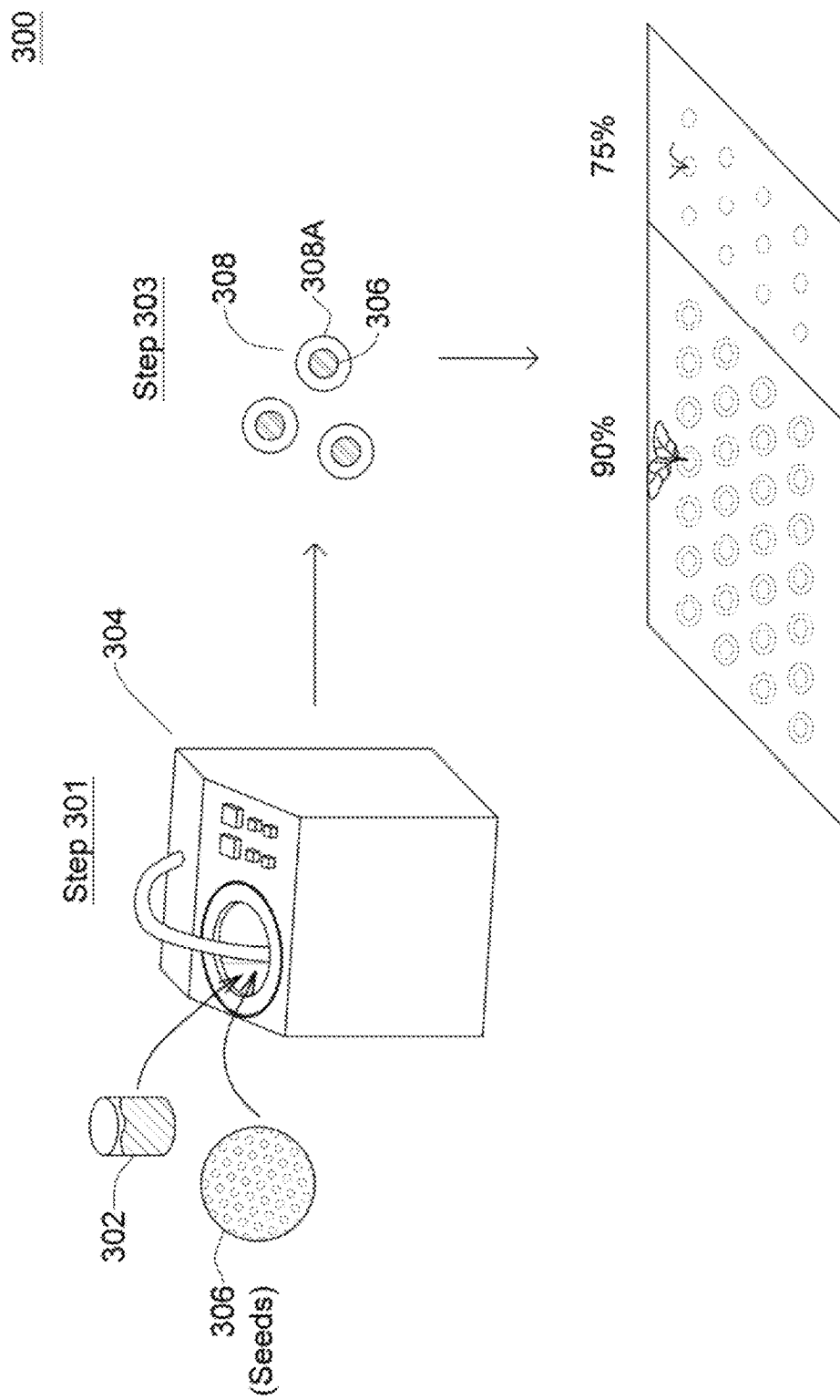
FIG. 3 illustrates a seed coating method 300 in accordance with some embodiments.

FIG. 3 illustrates a seed coating method 300 in accordance with some embodiments. A seed coating solution is prepared using the flavonoid solution manufacturing method disclosed above (e.g., FIGS. 1C, 1D, and 1E). At Step 301, seeds 306 and the seed coating solution 302 are added and mixed at the seed coating device 304. At Step 303, coated seeds 308 are formed, wherein seeds 306 are coated/encapsulated forming a seed coating/encapsulation layer 308A. The trail results show that the seed germination rate increased from 75% (without applying the seed coating solution) to 99% (with the application of the seed coating solution).

FIG. 4 illustrates a plant stunting effect-preventing method 400 in accordance with some embodiments. In some embodiments, a plant stunting effect-preventing solution 404 is prepared using the flavonoid solution manufacturing method disclosed above (e.g., FIGS. 1C, 1D, and 1E). A stunting effect-preventing solution 404 and a herbicide 406 (or a pesticide) are mixed and added to the storage 408 forming an application solution 410 on an application car 402. The application solution 410 is applied in the filed. The trial results show that the plants 414 using the application 410 reverses the stunting effects on the plants. In other words, the plants 416 normally experienced at least two week slow in growth when a herbicide is used without the using the application solution 410.

Trial Results

Figure 5:
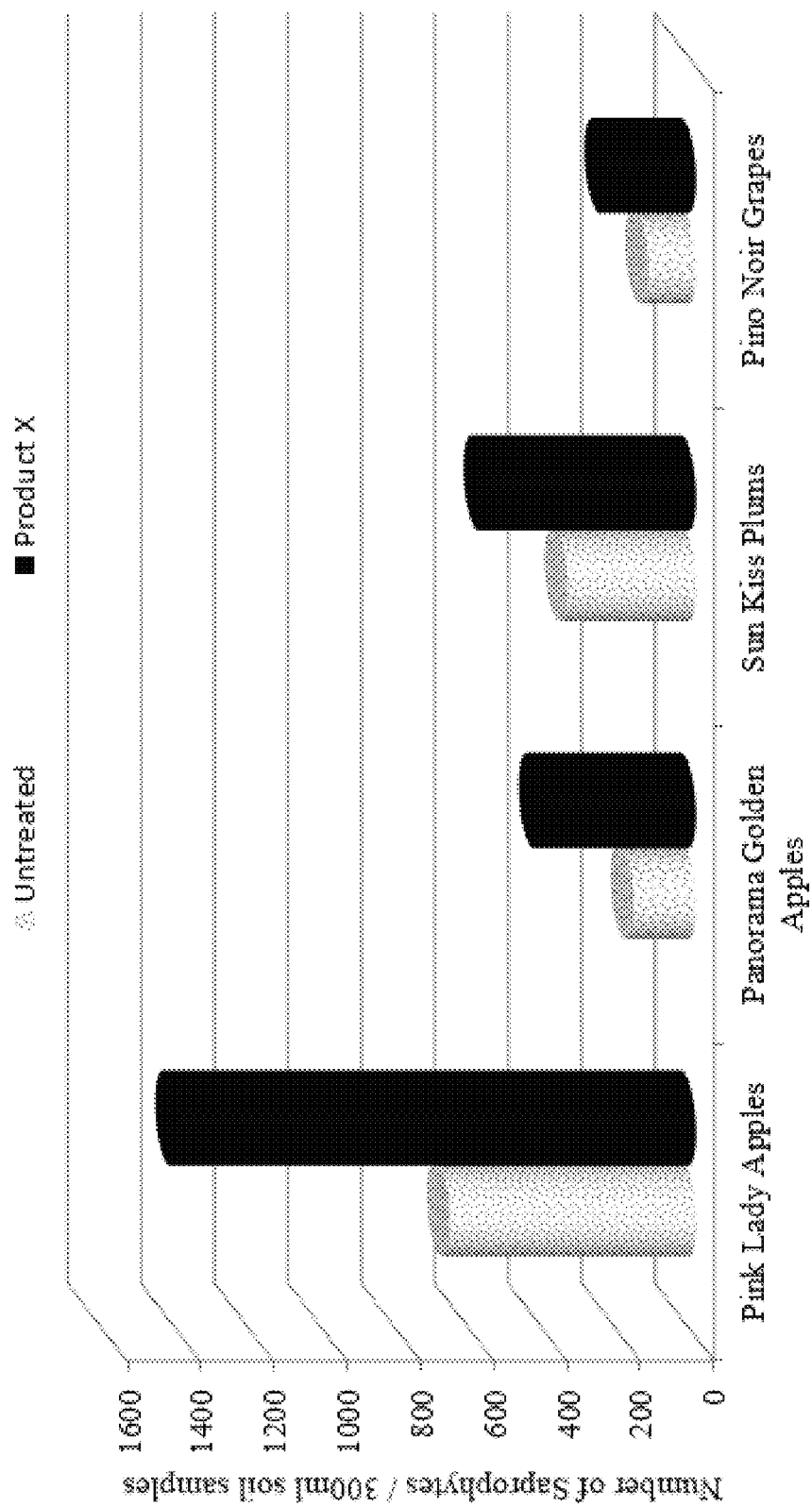
FIG. 5 illustrates a bar chart showing before/after spraying a flavonoid combination solution (Product X) to four different plants, the effect thereof on Saprophytic nematodes in soil samples in accordance with an embodiment of the present disclosure.

The flavonoid combination solution as prepared above is sprayed to the surface of leaves, stems, roots, fruits, flowers, or seeds of different plants, respectively. Some of the experimental results are shown as below:

Please refer to FIG. 5, which illustrates a bar chart showing before/after spraying a flavonoid combination solution (i.e. Product X) of the present disclosure to four different plants, the effect thereof on Saprophytic nematodes in soil samples. The four different plants are pink lady apples, panorama golden apples, sun kiss plums, and pinot noir grapes, which are sprayed with Product X three times per season. The spraying interval is 21-28 days. Product X is diluted with water in a ratio of 50 ml Product X to 100 L water, and is sprayed with an amount of 500-750 ml/ha. The results in FIG. 5 show Saprophytic nematodes (beneficial nematodes) in soil samples increase by spraying Product X.

Figure 6:
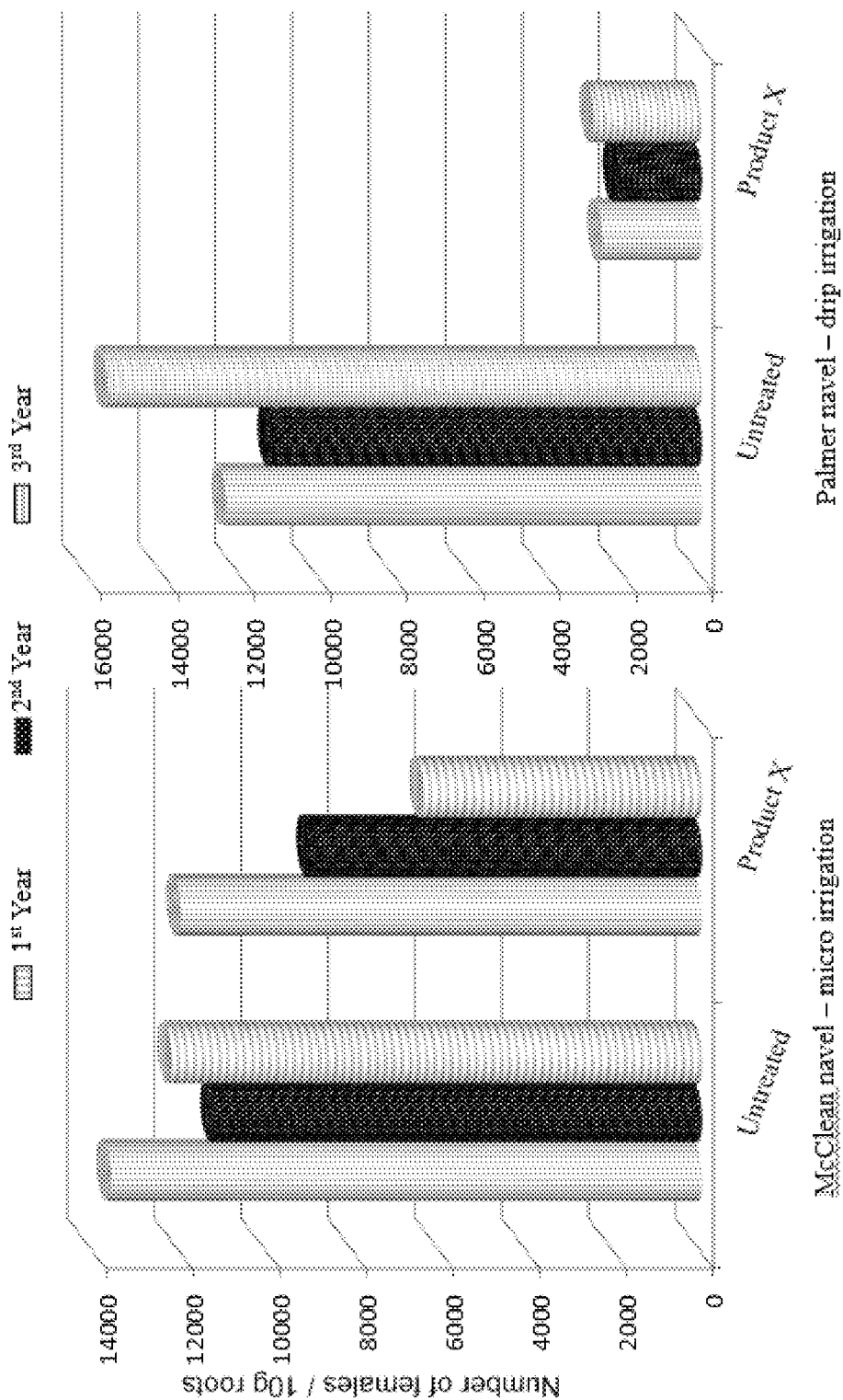
FIG. 6 illustrates a bar chart showing before/after spraying a flavonoid combination solution (Product X) to two different plants over three seasons in different years, the effect thereof on female citrus nematode in roots in accordance with an embodiment of the present disclosure.

FIG. 6 illustrates a bar chart showing before/after spraying a flavonoid combination solution (Product X) to two different plants over three seasons in different years, the effect thereof on female citrus nematode in roots. The two different plants are McClean navel—micro irrigation, and Palmer navel—drip irrigation. Product X is prepared in the same way as depicted in FIG. 5. The results in FIG. 6 show female citrus nematode (parasitic nematodes) in roots decrease after spraying Product X.

Figure 7:
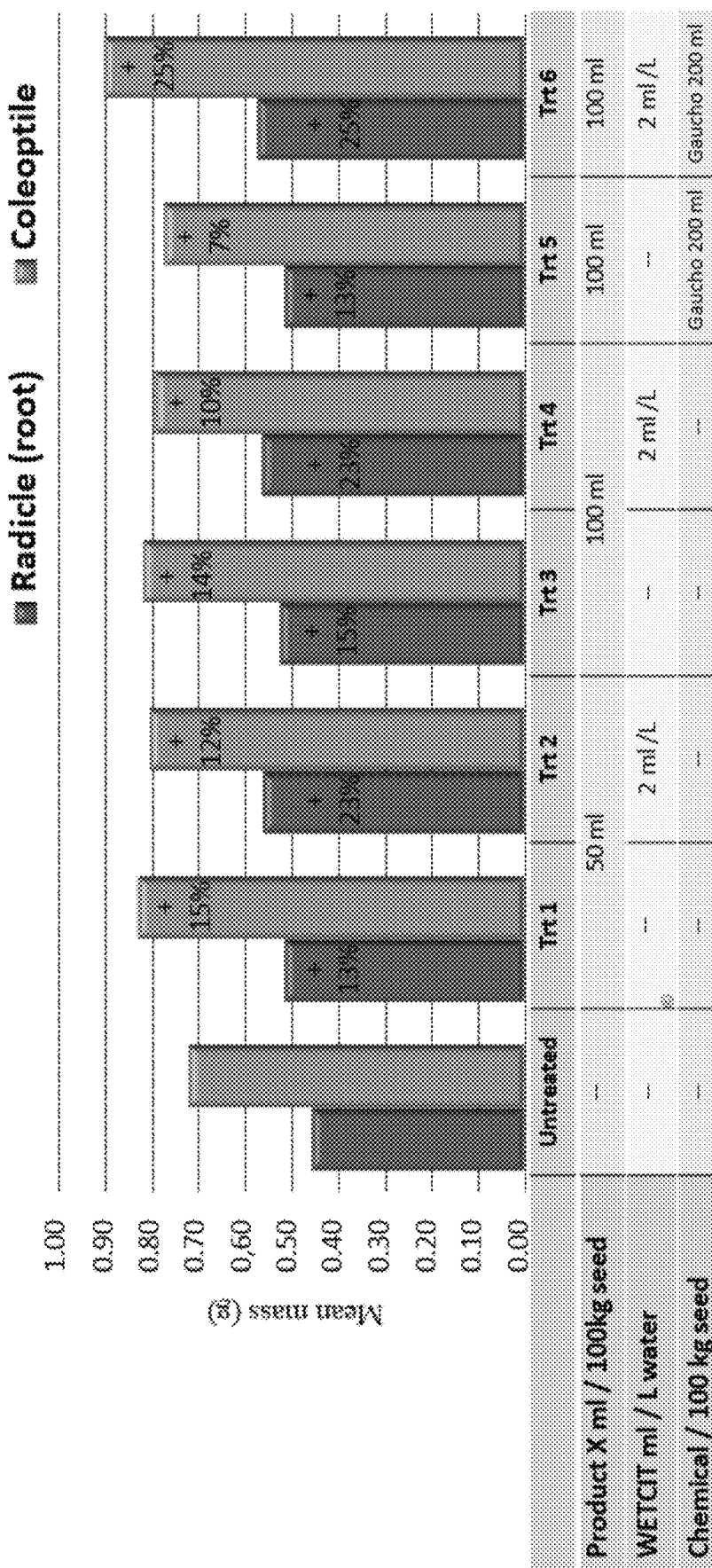
FIG. 7 illustrates a bar chart showing before/after coating a flavonoid combination solution (Product X) to wheat seeds with/without chemicals, the effect thereof on seed germination in accordance with an embodiment of the present disclosure.
Figure 8:
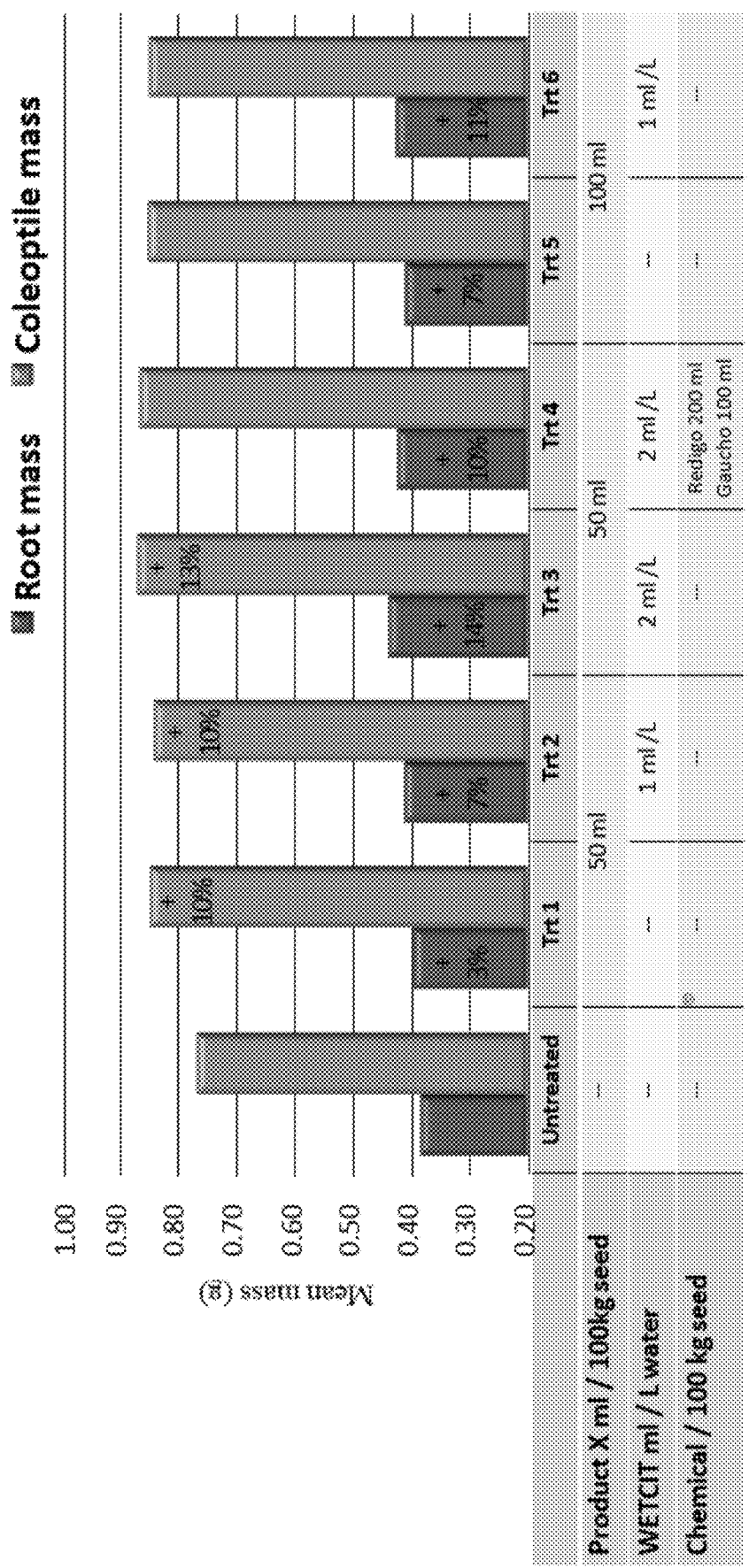
FIG. 8 illustrates a bar chart showing before/after coating a flavonoid combination solution (Product X) to oat seeds with/without chemicals, the effect thereof on seed germination in accordance with an embodiment of the present disclosure.
Figure 9:
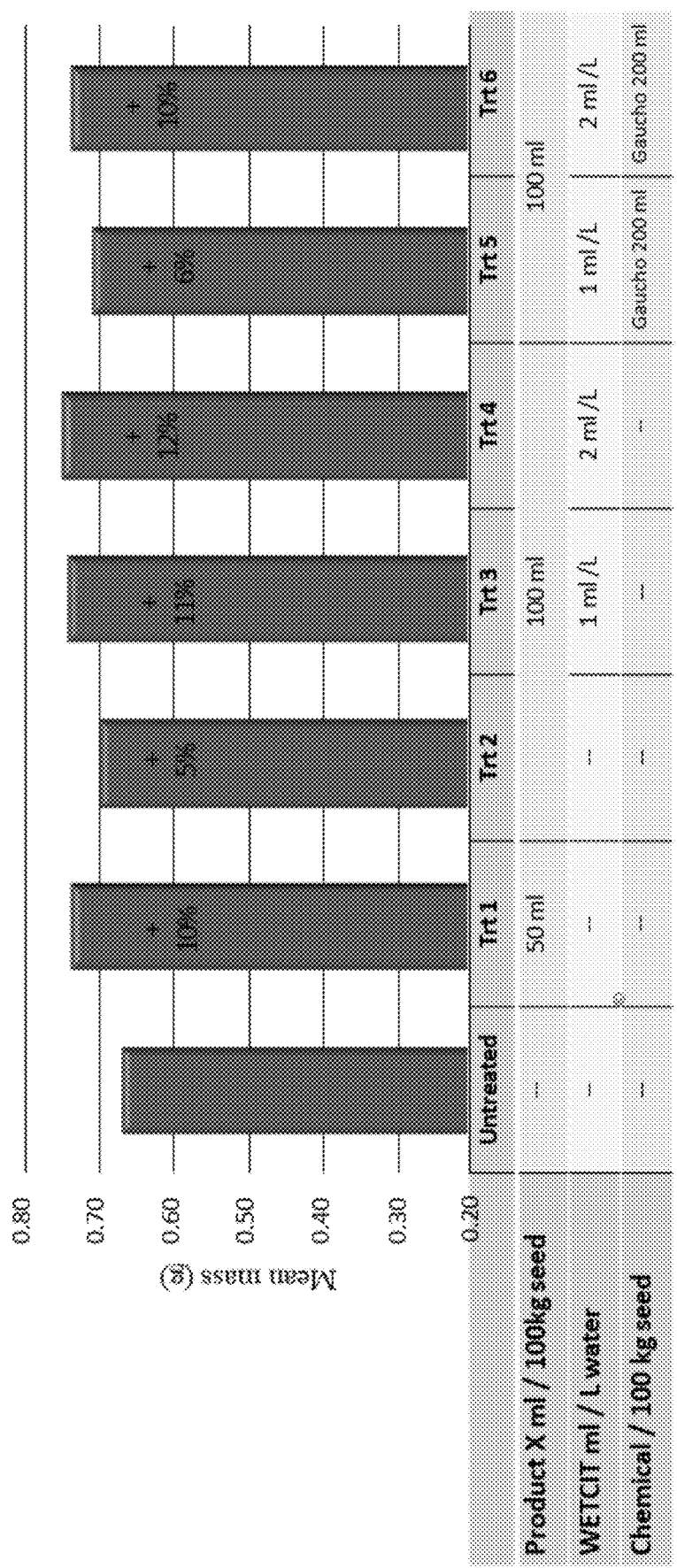
FIG. 9 illustrates a bar chart showing before/after coating a flavonoid combination solution (Product X) to canola seeds with/without chemicals, the effect thereof on seed germination in accordance with an embodiment of the present disclosure.

Please refer to FIGS. 7-9, which illustrate a bar chart showing before/after coating a flavonoid combination solution (Product X) to seeds of wheat, oats and canola, respectively, with/without WETCIT* and/or chemicals, the effect thereof on seed germination. Wherein, the seeds of oats, wheat and canola coated with Product X is incubated for 9 days and the amount of root and coleoptile are measured at $11^{th}$ days after treatment. The results in FIGS. 7 and 8 show the mean mass of both roots and coleoptile of wheat and oats increases; and the results in FIG. 9 also show the mean mass of canola roots including hypocotyl increases.

Figure 10:
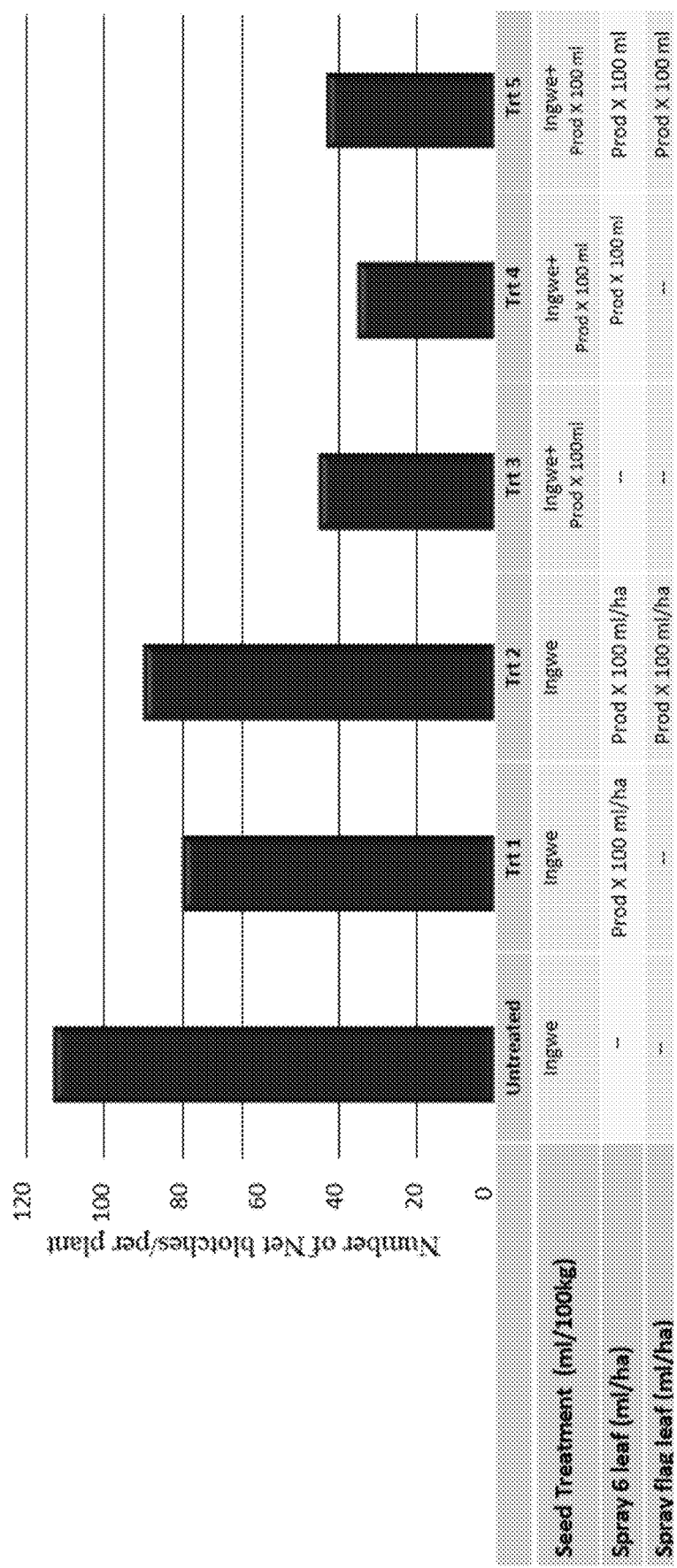
FIG. 10 illustrates a bar chart showing before/after coating or spraying a flavonoid combination solution (Prod X) to seeds and/or different leaves, the effect thereof on disease development in accordance with an embodiment of the present disclosure.

FIG. 10 illustrates a bar chart showing before/after coating or spraying a flavonoid combination solution (Prod X) to seeds and/or different leaves, the effect thereof on disease development Based on the results in FIG. 10, it can be found that seed treatment with a flavonoid combination solution of the present disclosure can effectively inhibit early disease development (i.e. disease suppression).

Figure 11:
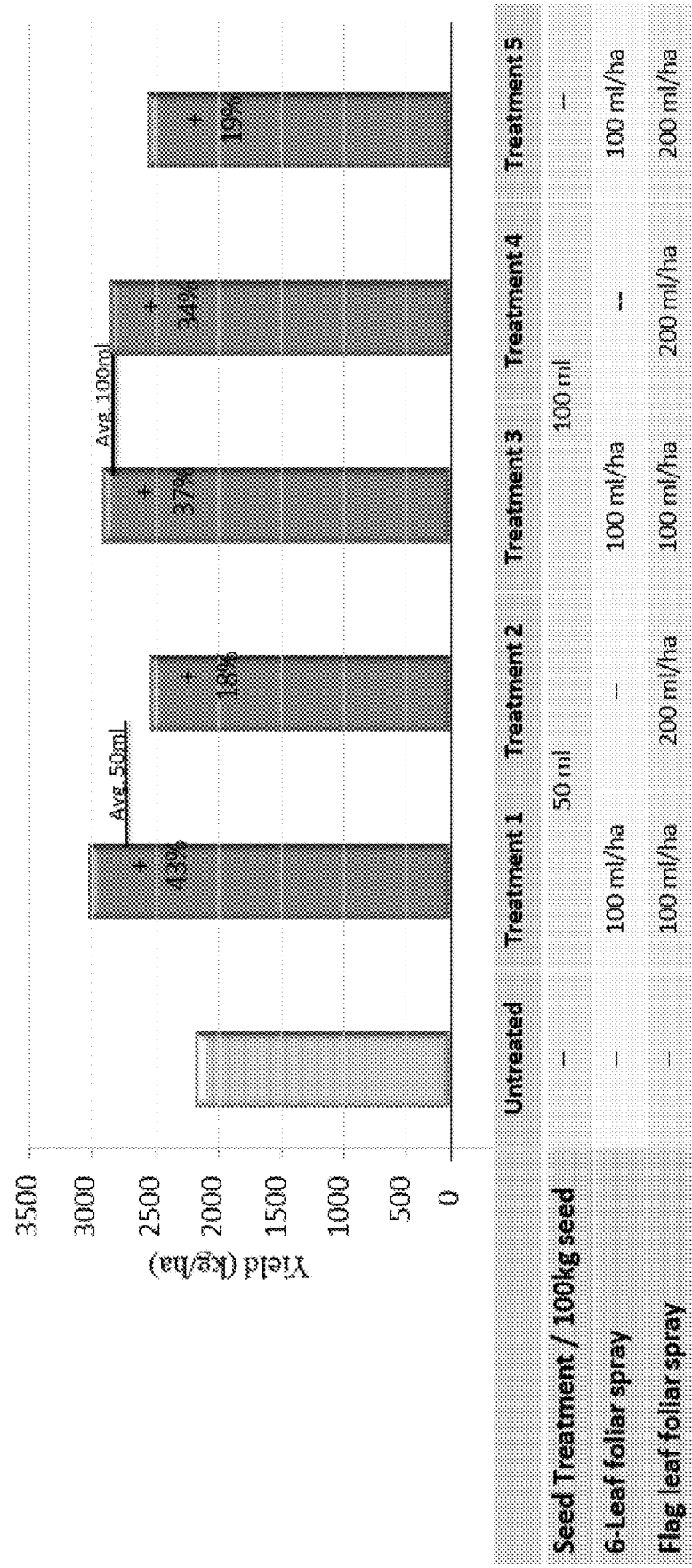
FIG. 11 illustrates a bar chart showing before/after coating or spraying a flavonoid combination solution to wheat seeds and/or different leaves, the effect thereof on yield in accordance with an embodiment of the present disclosure.
Figure 12:
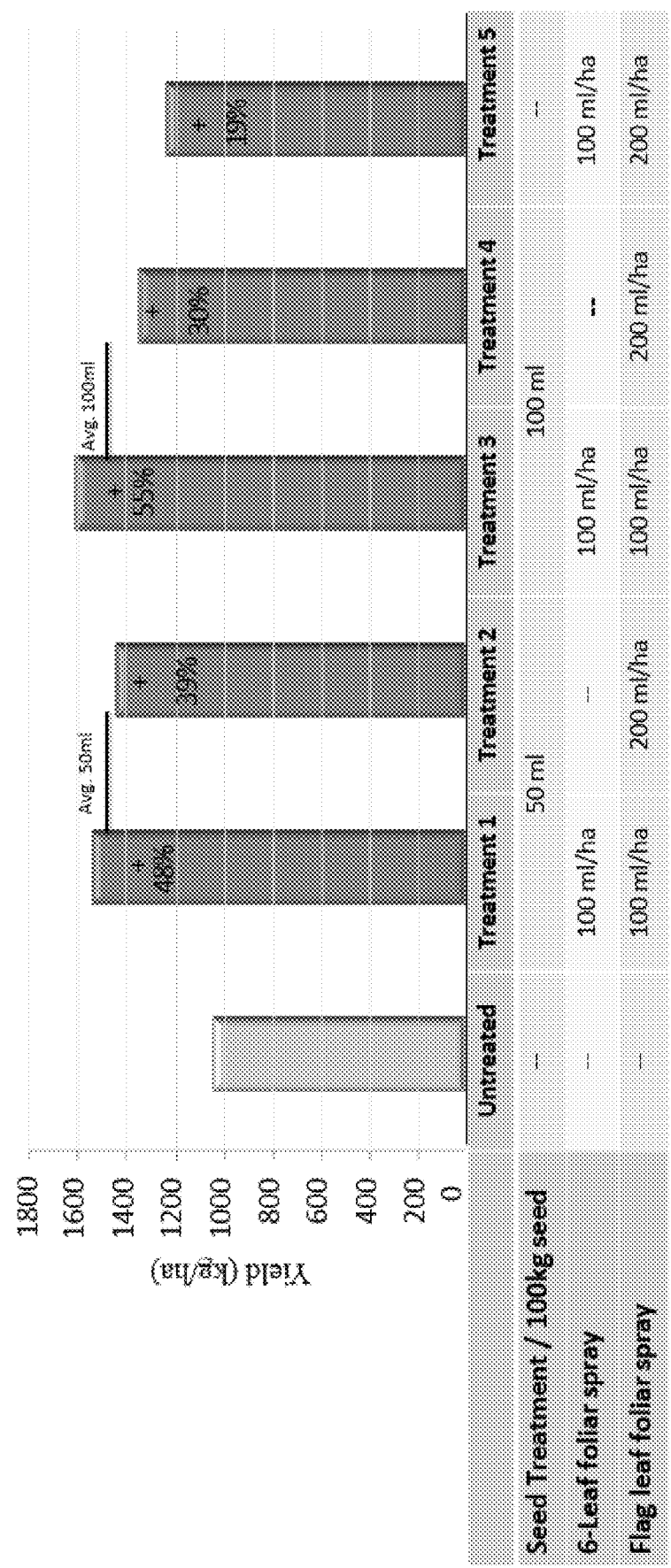
FIG. 12 illustrates a bar chart showing before/after coating or spraying a flavonoid combination solution to barley seeds and/or different leaves, the effect thereof on yield in accordance with an embodiment of the present disclosure.
Figure 13:
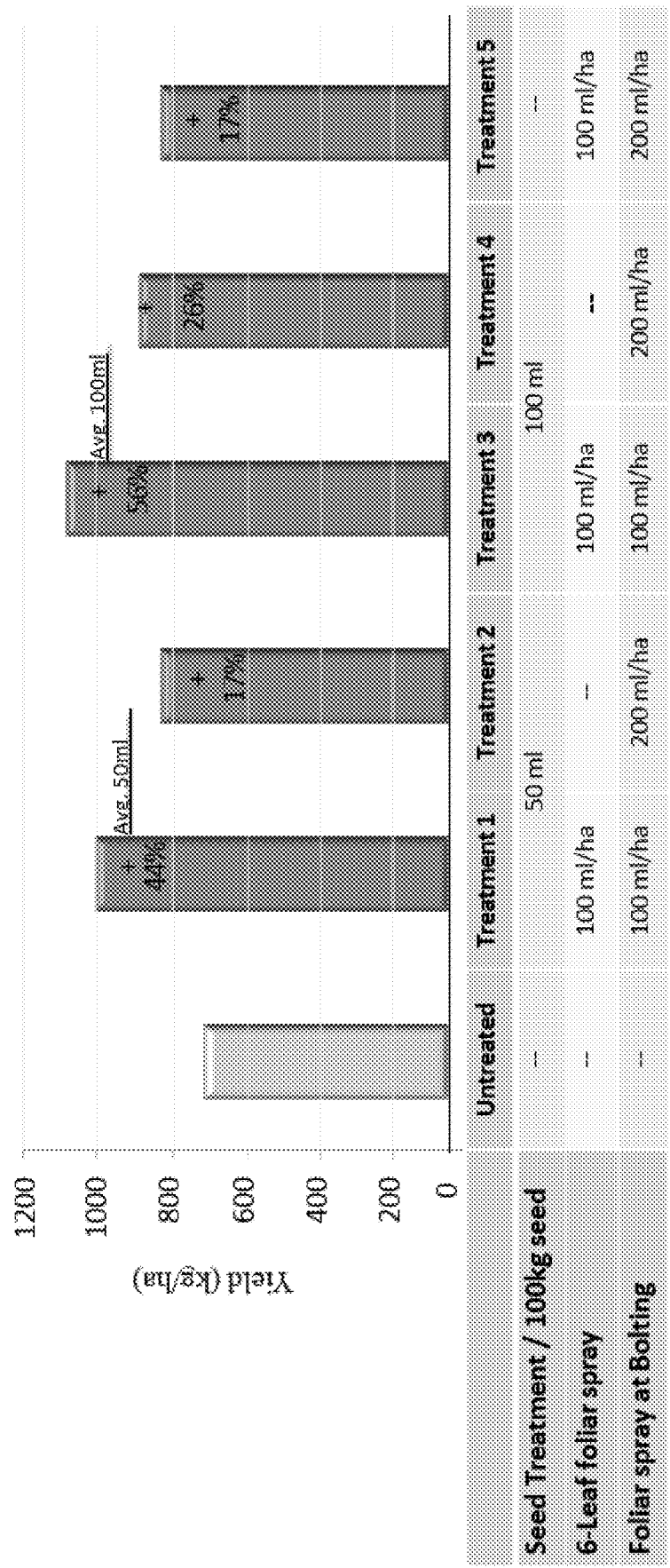
FIG. 13 illustrates a bar chart showing before/after coating or spraying a flavonoid combination solution to canola seeds and/or different leaves, the effect thereof on yield in accordance with an embodiment of the present disclosure.
Figure 14:
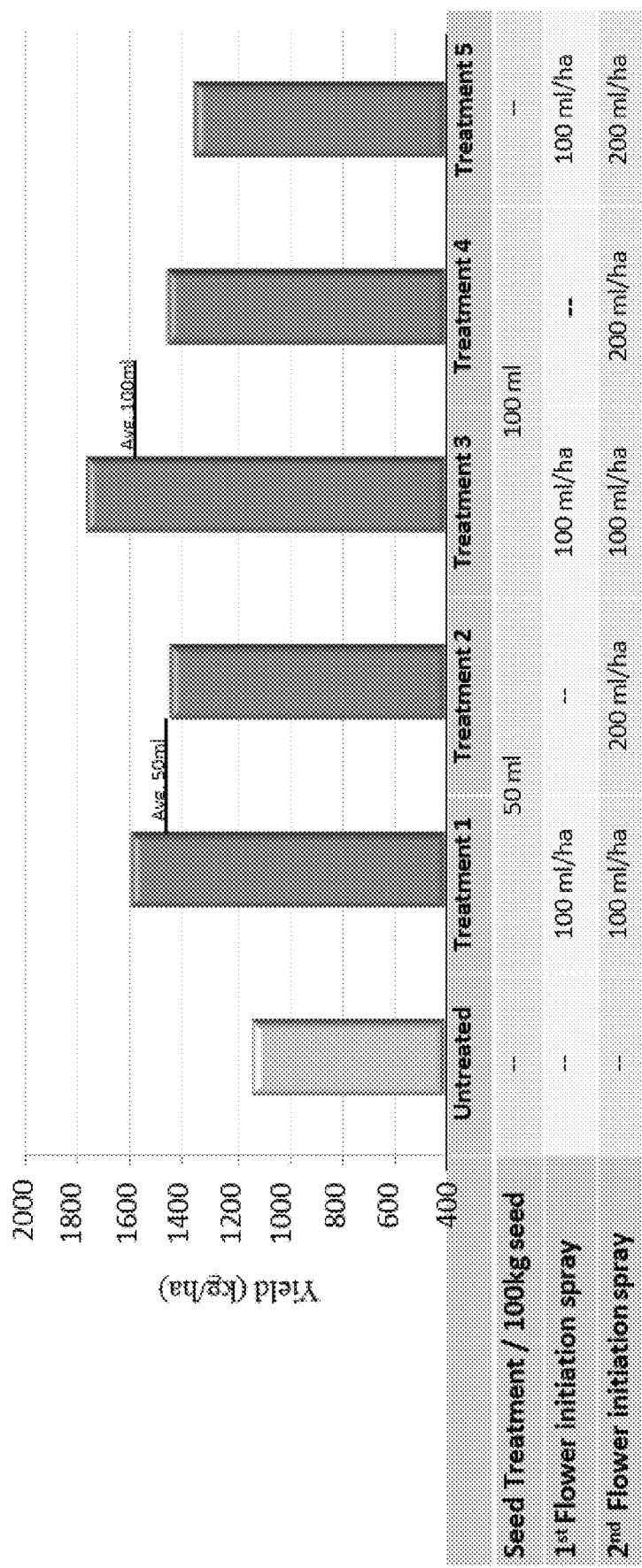
FIG. 14 illustrates a bar chart showing before/after coating or spraying a flavonoid combination solution to lupine seeds and/or different flowers, the effect thereof on yield in accordance with an embodiment of the present disclosure.

Please refer to FIGS. 11-14, wherein FIGS. 11-13 illustrate a bar chart before/after coating or spraying a flavonoid combination solution to seeds and/or different leaves of wheat, oats and canola, respectively, the effect thereof on yield; FIG. 14 illustrates a bar chart showing before/after coating or spraying a flavonoid combination solution to lupine seeds and/or different flowers, the effect thereof on yield. The results thereof show the plants treated with the flavonoid combination solution of the present disclosure will definitely enhance the yield thereof.

Inhibition of Fungal Pathogens

EXAMPLE 1

The flavonoid mixture solution (e.g., the flavonoid combination solution) of the present disclosure is effective in inhibit fungal pathogens in plants. Pathogen growth inhibition is measured using potato dextrose agar (PDA) amended with 0.5% and 1.0% of the flavonoid mixture solution to compare colony growth of several fungi. Plain (unamended) PDA plates served as controls. Cultures of *Aspergillus niger, Botrytis cinerea, Colletotrichum fioriniae, Fusarium moniliforme, F. oxysporum, Macrophomina phaseolina, Verticillium dahlia*, and *Xanthomonas arboricola* pv. *juglandis* are grown on acidified potato dextrose agar. The amended and control plates are inoculated with mycelial plugs (5 mm diameter), then incubates at 25° C. until the colonies in the controls neared the edge of the plates for each species. At that time, colony radius is measured and percent inhibition is calculated for this compound in relation to the radius of control plates. The flavonoid mixture solution used in these tests is shown in Table 1 below:

TABLE 1

Percent inhibition by flavonoid mixture solution of various fungal pathogens in relation to untreated control[1]

| Treatment | Aspergillus niger | Botrytis cinerea | Colletotrichum fioriniae | Fusarium moniliforme | Fusarium oxysporum | Macrophomina phaseolina | Verticillium dahliae | Xanthomonas arboricola pv. juglandis |
|---|---|---|---|---|---|---|---|---|
| 0.5% | 100.00 | 100.00 | 100.00 | 100.00 | 100.00 | 100.00 | 100.00 | 100.00 |
| 1.0% | 100.00 | 100.00 | 100.00 | 100.00 | 100.00 | 100.00 | 100.00 | 100.00 |

[1]Data are from 4 replicated plates with almost 0% variation.

The flavonoid mixture solution inhibited the growth of all 8 fungal pathogens by 100% even at the low concentration of 0.5% (Table 1). It shows that this solution is very active.

EXAMPLE 2

The flavonoid mixture solution also shows effectiveness in reducing/treating citrus greening disease. The solution shows effectiveness in inhibiting liberibacter crescens and candidatus liberibacter.

EXAMPLE 3

The flavonoid mixture solution also shows effectiveness in reducing/killing/inhibiting on grapevine powdery mildew. Powdery mildew on grapes is caused by the fungus *Erysiphe necator*. The flavonoid mixture solution shows as an effective powdery mildew control agent on leaves and berries.

TABLE 2

Percent Reduction of Leaf Powdery Mildew Severity

|  | Flavonoids Mixture | Untreated |
| --- | --- | --- |
| Leaf Powdery Mildew Severity | 43% | 74% |

TABLE 3

Percent Reduction of Cluster Powdery Mildew Severity

|  | Flavonoids Mixture 2% | Untreated |
| --- | --- | --- |
| Leaf Powdery Mildew Severity | 23% | 36% |

Terminology

Flavonoids: Flavonoids are used as a general term to encompass chemical structure of a 15-carbon skeleton, which contains two phenyl rings and a heterocyclic ring. The carbon structure can include C6-C3-C6. Thus, flavonoids term used herein can include flavones, carotenoid, tannin, flavonols, catechin, and others in some embodiments.

Carrier solvents: Carrier solvents disclosed herein including triglyceride, glycerol and ethanol, which are substances used to dissolve, dilute, disperse or otherwise physically modify a food additive or flavoring without altering its function in order to facilitate its handling, application or use. Any other chemical substances that are functional equivalent are within the scope of the present disclosure. Here, carrier solvents are able to be used to enhance the solubility of the flavonoids and make the solid or powder flavonoids to be more liquid like or in a liquid form.

Solvent: A solvent is a substance that dissolves a solute, resulting in a solution. A solvent is usually a liquid but can also be a solid, a gas, or a supercritical fluid. Here, the carboxylic acids are able to be used to enhance the solubility of flavonoids and the carrier solvents (e.g., triglyceride, glycerol and ethanol) and make the flavonoids and the carrier solvents in a liquid form, a suspension liquid, or a dissolved liquid (e.g., homogeneous liquids).

Percentages: All the percentages disclosed should be adjusted to 100% as appreciated by a person of ordinary skill in the art.

Weight percentage: abbreviation wt % can mean weight percentage.

Group: Group used herein contains one or more substances or ingredients in the group. For example, a fatty acid group includes one or more of fatty acids that are used. In some embodiments, triglyceride and/or glycerol are used.

Processing sequence: In some embodiments, the ingredients are able to be added one by one in sequence. In some embodiments, the ingredients are able to be added one concurrently.

Solutions: The embodiments that are disclosed in solutions are able to be performed in solid or powder form in some embodiments.

A combination thereof: also include a combination of all the ingredients together.

Some further aspects of the present disclosure:

1. The method of 1, wherein a ratio of the at least one first plant extract, the first fatty acid and the first carboxylic acid is 8-12 wt %: 35-40 wt %: 16-20 wt % based on a total weight of the first solution.
2. The method of 1, wherein a ratio of the at least one second plant extract, the second fatty acid and the second carboxylic acid is 30-40 wt %: 25-30 wt %: 16-21 wt % based on a total weight of the second solution.
3. The method of 1, wherein a ratio of the at least one second plant extract, the second fatty acid and the second carboxylic acid is 30-40 wt %: 25%-30% wt %: 16%-21% wt % based on a total weight of the second solution.
4. The method of 1, wherein at least one of the first solution and the second solution further comprises water, alcohols, vitamin C, 2-hydroxypropanoic acid, carbohydrates, monobasic esters, and any combination thereof.
5. The method of 1, wherein the second solution further comprises resveratrol, trans-3,3',5,5'-tetrahydroxy-4'-methoxystilbene, yuccaols A-E, yuccaone A, larixinol, or any combination thereof.
6. The method of 1, wherein the least one first plant extract and the least one second plant extract are same or different to each other; the first fatty acid and the second fatty acid are same or different to each other; and the first carboxylic acid and the second carboxylic acid are same or different to each other.
7. The method of 6, wherein the at least one first plant extract and the least one second plant extract are extracted from citrus skin, grape seed, grape skin, wheat, rice, caper, radish leaves, buckwheat, celery, thyme, green peppers, or any combination thereof.
8. The method of 6, wherein the flavone is selected from a group consisting of rhoifoli, neodiosmin, or any combination thereof.
9. The method of 6, wherein the flavonol is selected from a group consisting of 3-hydroxyflavone, quercetin, kaempferol, myricetin, fisetin, galangin, isorhamnetin, pachypodol, rhamnazin, pyranoflavonols, furanoflavonols, or any combination thereof.
10. The method of 6, wherein the derivative of the flavonol comprises flavonol glycosides.
11. The method of 10, wherein the flavonol glycoside is selected from a group consisting of kaempferol 3-O-rhamnoside-7-O-rhamnoside, quercetin, rutinoside, quercetin-3-O-rutinoside, isoquercetin, caffeoyl, luteolin, or any combination thereof
12. The method of 6, wherein the flavanone is selected from a group consisting of butin, eriodictyol, hesperetin, hesperidin, neohesperidin, homoeriodictyol, isosakuranetin, naringenin, naringin, isonarinagin, pinocembrin, poncirin, sakuranetin, sakuranin, sterubin, pinostrobin, neoeriocitrin, or any combination thereof.

13. The method of 10, wherein the flavonol glycoside is selected from a group consisting of kaempferol 3-O-rh amno si de-7-O-rhamnoside, quercetin, rutinoside, quercetin-3-O-rutinoside, isoquercetin, caffeoyl, luteolin, or any combination thereof 14. The method of 6, wherein the first carboxylic acid and the second carboxylic acid are independently selected from a group consisting of carbonic acid, butanoic acid, ethanoic acid, malic acid, methanoic acid, pentanoic acid, hexanoic acid, decanoic acid, hexadecanoic acid, octadecanoic acid, or any combination thereof.

15. The method of 1, wherein the predetermined temperature is in a range of 40° C.-130° C.

16. The method of 1, wherein the step of mixing the first solution and the second solution further comprising adding a third fatty acid therein.

17. The method of 16, wherein the third fatty acid is selected from a group consisting of palm kernel olein, coconut oil, palm olein, palm oil, or any combination thereof.

18. A flavonoid combination solution, manufactured by the method of 1.

19. A method of enhancing plant growth development, comprising a step of spraying or coating the flavonoid combination solution of 18 on at least one of leaves, stems, roots, fruits, and seeds of a plant, and/or a step of adding the flavonoid combination solution of claim 18 into soil for planting the plant.

20. The method of 19, wherein the plant growth development comprises activation of plant growth rate, metabolic signals, carbon dioxide absorption rate, carbon dioxide utilization, photosynthesis, seed germination, pollen germination, tuber size, root growth, yield, fruit size, regulation of soil microbial composition, beneficial symbiosis, change of chemical and physical traits of the soil, protection against unbeneficial insects, pathogens or nematodes, postharvest resistance, improvement of transfer of infection, pollinator attraction, color enhancement, plant health, harvest maturity, nutrient uptake, or any combination thereof.

The description is presented to enable one of ordinary skill in the art to make and use the invention. Various modifications to the described embodiments are readily apparent to those persons skilled in the art and the generic principles herein can be applied to other embodiments. Thus, the present invention is not intended to be limited to the embodiments shown but is to be accorded the widest scope consistent with the principles and features described herein. It is readily apparent to one skilled in the art that other modifications can be made to the embodiments without departing from the spirit and scope of the invention as defined by the appended claims.

What is claimed is:

1. A method of reducing the stunting effect of an herbicide, comprising:
    a) mixing an amount of an herbicide and a flavonoid combination solution forming an application solution; and
    b) applying the application solution onto plants;
    wherein the flavonoid combination solution is prepared using the steps of:
        i) mixing the following materials with heating to >85° C. or without heating to obtain a first solution:
            (1) water, triglyceride and glycerol;
            (2) first plant extracts comprising a group of flavonol glycosides comprising kaempferol 3-O-rhamnoside-7-O-rhamnoside, quercetin, rutinoside, quercetin-3-O-rutinoside, isoquercetin, caffeoyl, and luteolin; and
            (3) first carboxylic acids comprising carbonic acid, butanoic acid, ethanoic acid, methanoic acid, pentanoic acid, hexanoic acid, decanoic acid, hexadecanoic acid, and octadecanoic acid;
        ii) mixing the following materials without heating to obtain a second solution:
            (1) saponins comprising resveratrol, trans-3,3',5,5'-tetrahydroxy-4'-methoxystilbene, yuccaols A-E, yuccaone A, and larixinol;
            (2) second plant extracts comprising a group of flavanones comprising butin, eriodictyol, hesperetin, hesperidin, homoeriodictyol, isosakuranetin, naringenin, naringin, pinocembrin, poncirin, sakuranetin, and sakuranin; and a group of flavanols comprising 3-hydroxyflavone, quercetin, kaempferol, myricetin, fisetin, galangin, isorhamnetin, pachypodol, rhamnazin, pyranoflavonols, and furanoflavonols;
            (3) triglyceride, glycerol and ethanol;
            (4) second carboxylic acids comprising carbonic acid, butanoic acid, ethanoic acid, methanoic acid, pentanoic acid, hexanoic acid, decanoic acid, hexadecanoic acid, and octadecanoic acid; and
            (5) anti-oxidants comprising vitamin C or 2-hydroxypropanoic acid; and
        iii) forming the flavonoid combination solution by mixing the first solution and the second solution with a palm oil blend;
        wherein wherein the weight ratio of a combination of the first solution and the second solution to the palm oil blend is 5:1 or 6:1 a weight ratio of the first solution and the second solution to the palm oil blend is 5:1 or 6:1.

* * * * *